United States Patent [19]

Kazama et al.

[11] Patent Number: 5,438,415
[45] Date of Patent: Aug. 1, 1995

[54] ELLIPSOMETER AND METHOD OF CONTROLLING COATING THICKNESS THEREWITH

[75] Inventors: Akira Kazama; Takahiko Oshige; Yoshiro Yamada; Takeo Yamada; Takeshi Yamazaki; Takamitsu Takayama; Shuichiro Nomura, all of Tokyo, Japan

[73] Assignee: NKK Corporation, Tokyo, Japan

[21] Appl. No.: 927,410

[22] PCT Filed: Jan. 27, 1992

[86] PCT No.: PCT/JP92/00067

§ 371 Date: Sep. 22, 1992

§ 102(e) Date: Sep. 22, 1992

[87] PCT Pub. No.: WO92/14119

PCT Pub. Date: Aug. 20, 1992

[30] Foreign Application Priority Data

Jan. 30, 1991 [JP] Japan ................. 3-029296
Apr. 5, 1991 [JP] Japan ................. 3-100405
Nov. 13, 1991 [JP] Japan ................. 3-296868

[51] Int. Cl.$^6$ ............................................ G01B 11/06
[52] U.S. Cl. ................................. 356/369; 356/367
[58] Field of Search ............. 356/364, 365, 366, 367, 356/369; 250/225; 359/507, 508, 509, 511

[56] References Cited

U.S. PATENT DOCUMENTS

| 3,626,141 | 12/1971 | Daly ................. 359/507 |
| 3,696,230 | 10/1972 | Friedrich ............. 359/509 |
| 4,652,133 | 3/1987 | Antoszewski et al. ..... 356/376 |
| 4,850,711 | 7/1989 | Sano et al. |
| 4,872,758 | 10/1989 | Miyazaki et al. |
| 5,073,025 | 12/1991 | Brooks ............. 356/367 |
| 5,102,222 | 4/1992 | Berger et al. ......... 356/367 |

FOREIGN PATENT DOCUMENTS

| 0339845 | 11/1989 | European Pat. Off. |
| 57-166533 | 10/1982 | Japan |
| 61-83924 | 4/1986 | Japan |
| 61-209338 | 9/1986 | Japan |
| 62-293104 | 12/1987 | Japan |
| 63-36105 | 2/1988 | Japan |
| 64-28509 | 1/1989 | Japan |
| 2-116705 | 5/1990 | Japan |

OTHER PUBLICATIONS

Patent Abstracts of Japan, vol. 12, No. 439 (P-788), Nov. 18, 1988 & JP-1-63168540 (Japan Spettroscopic Co.) Jul. 12, 1988.
Soviet Patents Abstracts, Section EI, Week 9031, Derwent Publications Ltd., London, GB; Class S, AN 90-237599 & SU-A-1518728 (NUCL PROBL BELORUSS).
Preliminary Reports for Lecture of the 52nd Applied Physics Society, p. 844, Oct. 9, 1991.
Magneto-Optical Rotation and Ellipticity Measurements with a Spinning Analyzer; Review of Scientific Instruments; vol. 12, No. 1; Jan. 1971; J. C. Suits.

Primary Examiner—Hoa Q. Pham
Attorney, Agent, or Firm—Frishauf, Holtz, Goodman & Woodward

[57] ABSTRACT

An ellipsometer has a nonpolarization beam splitter (18) for dividing reflected light (17) from an object to be measured (16) into portions traveling along first and second optical paths (18a, 18b), an analyzer (19) for passing the polarized light component in a reference direction of the reflected light portion traveling along the first optical path, and a polarization beam splitter (20) for dividing the reflected light portion traveling along the second optical path into two polarized light components in different directions with respect to the reference direction. The light beams passing through the analyzer (19) and polarization beam splitter (20) are sensed by first, second and third photodetectors (21a, 21b, 21c), respectively. In a coating thickness control method, first and second ellipsometers (35a, 35b) are placed before and after a coating apparatus (36) provided along the transport path of a belt-like plate to be coated (31). A first ellipsoparameter ($\Delta 1, \psi 1$) for the surface of the plate before coating is obtained with the first ellipsometer (35a). A second ellipsoparameter ($\Delta 2, \psi 2$) for the surface of the plate after coating is obtained with the second ellipsometer (35b). The coating apparatus (36) controls the coating thickness (d) based on the difference between the first and second ellipsoparameters.

8 Claims, 13 Drawing Sheets

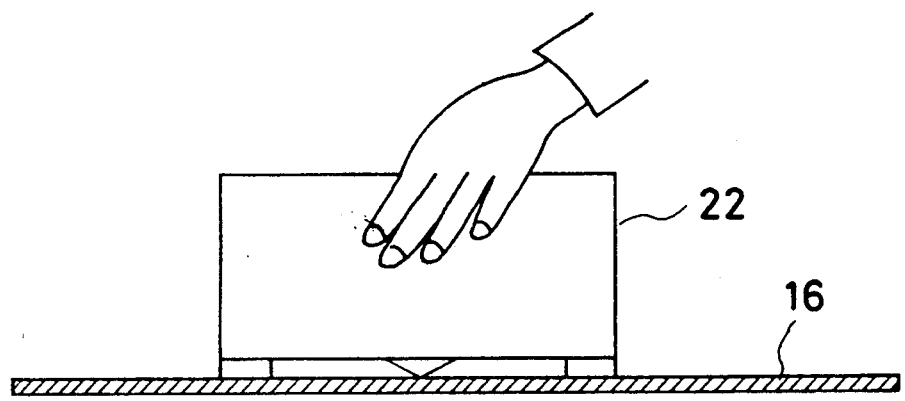
F I G. 3
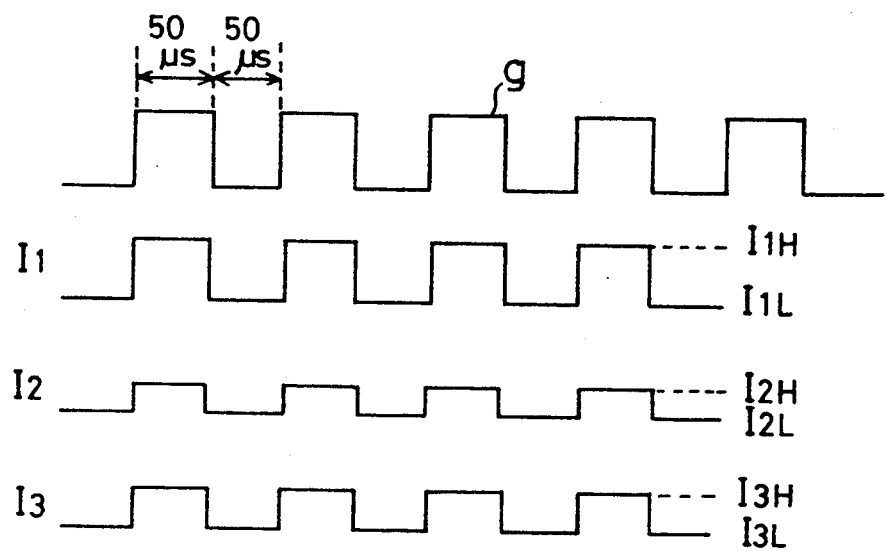
F I G. 4

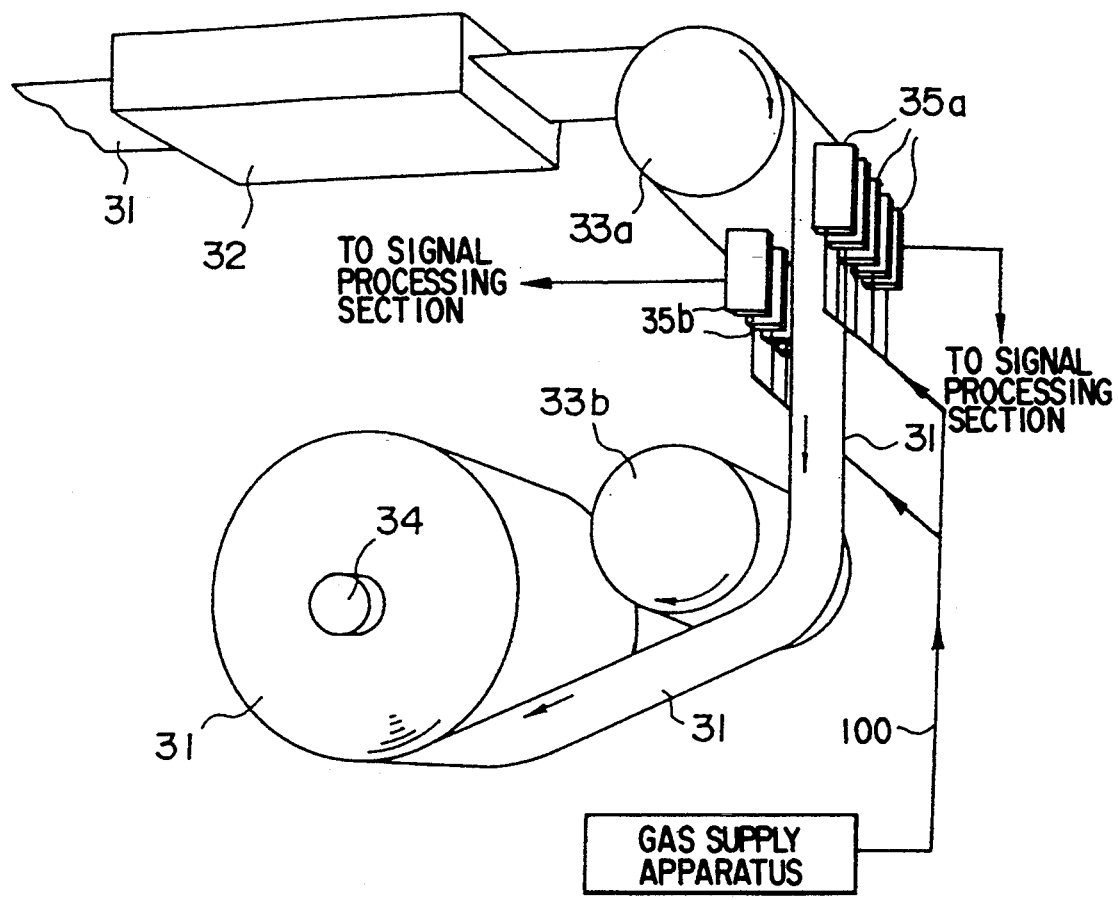
F I G. 11

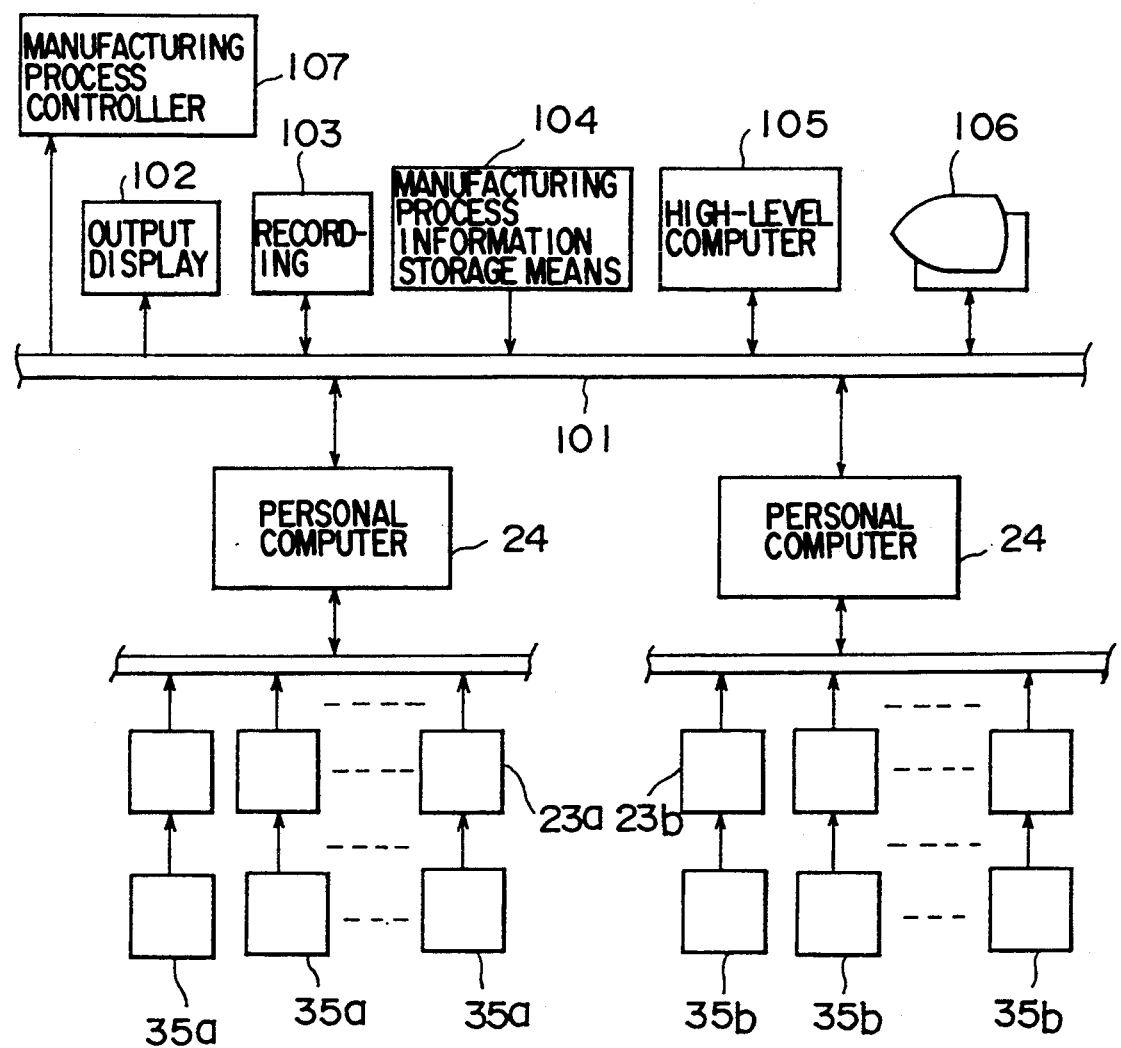
F I G. 14

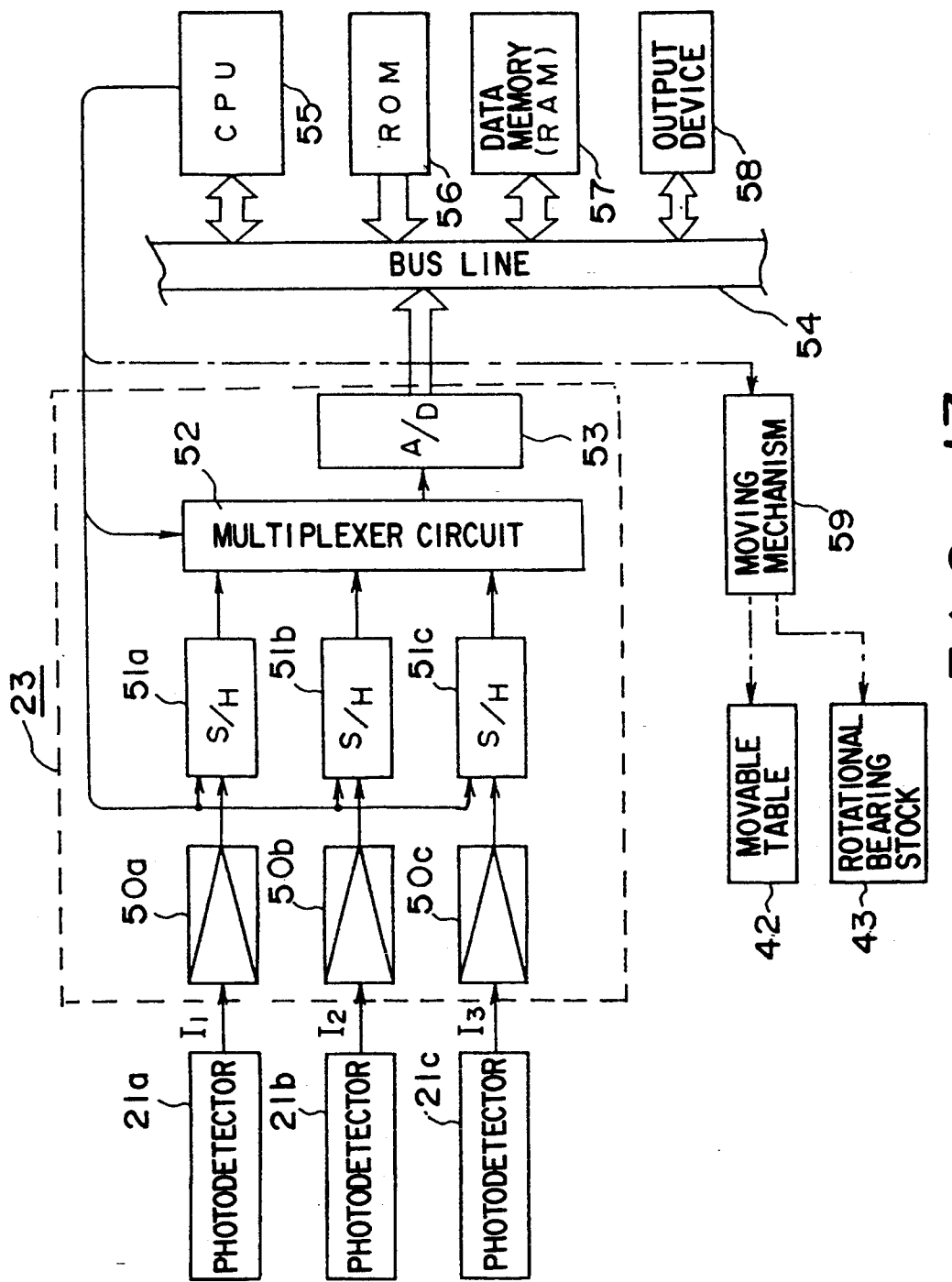
F I G. 17

ELLIPSOMETER AND METHOD OF CONTROLLING COATING THICKNESS THEREWITH

TECHNICAL FIELD

This invention relates to an ellipsometer for measuring the thickness of thin films accurately, and more particularly to a compact, highly accurate ellipsometer with a reduced number of optical parts of the light sensing section, the parts being fixed, and a method of controlling a coating thickness therewith.

BACKGROUND ART

Ellipsometry is used to measure the thickness of thin films of, for example, several 100 nm or less. In this method, what is measure is a change in the polarized state when light is reflected by the surface of a specimen such as a thin film, or the ratio $\rho$ of the reflectivity Rp of a parallel component (P component) to the plane of incidence of electric-field vector to the reflectivity Rs of a perpendicular component (S component), expressed as equation (1). According to an already known specific relationship between polarization reflectivity ratio $\rho$ and film thickness d, the thickness d of the thin film is calculated as:

$$\rho = Rp/Rs = \tan\psi \exp[j\Delta] \quad (1)$$

The polarization reflectivity ratio $\rho$ is expressed by two ellipsoparameters, amplitude ratio $\psi$ and phase difference $\Delta$, as shown in equation (1). These two ellipsoparameters are physical quantities obtained by measurement.

To compute these ellipsoparameters $\psi$ and $\Delta$, an 3-channel ellipsometer with no moving parts as shown in FIG. 18 has been developed, as disclosed in Published Unexamined Japanese Patent Application No. 1-28509.

The light of a single wavelength emitted from a light source 1 made up of a laser light source is converted into linearly polarized light by a polarizer 2 and is directed to the surface of a specimen 3, the object to be measured, at an incident angle of $\phi$. At the specimen surface 3, the plane of incidence is parallel to the paper on which the figure is drawn. It is assumed that the direction parallel to the paper is direction P and the direction perpendicular to the paper is direction S. The reflected light from the specimen surface 3 is split into three light beams by three nonpolarization beam splitters 4a, 4b, and 4c.

A first light passing through two beam splitters 4a and 4b is directed to a first photodetector 7a via a first analyzer 5a and a first condenser lens 6a. The first photodetector 7a converts the intensity I1 of the first light into an electric signal. Similarly, a second light reflected by beam splitter 4b after passing through beam splitter 4a is directed to a second photodetector 7b via a second analyzer 5b and a second condenser lens 6b. The second photodetector 7b converts the intensity I2 of the second light into an electric signal. A third light passing through beam splitter 4c after being reflected by beam splitter 4a is directed to a third photodetector 7c via a third analyzer 5c and a third condenser lens 6c. The third photodetector 7c converts the intensity I3 of the third light into an electric signal.

The analyzers 5a to 5c pass only optical components oscillating in a preset direction. The polarizing direction of the first analyzer 5a is set to the reference direction (with an angle of 0°); that of the second analyzer 5b is set to a direction inclined +45° with respect to the reference direction; and that of the third analyzer 5c is set to a direction inclined −45° with respect to the reference direction. The reference direction is determined in such a way that a direction (direction P) parallel to the plane of incidence on the specimen surface 3 has an angle of 0°, as shown by arrow "a" when viewed from the photodetector 7a.

Therefore, when the light reflected by the specimen surface 3 is polarized elliptically as shown in FIG. 19, the first light intensity I1 at the first photodetector 7a indicates an amplitude of the orthogonal projection of the elliptically polarized light on the abscissa (in the direction with an angle of 0°); the second light intensity I2 at the second photodetector 7b represents an amplitude of the orthogonal projection of the elliptically polarized light on a line inclined +45°; and the third light intensity I3 at the third photodetector 7c shows an amplitude of the orthogonal projection of the elliptically polarized light on a line inclined −45°.

The aforementioned ellipsoparameters $\psi$ and $\Delta$ are the amplitude ratio $\psi$ of component P to component S of the elliptically polarized light reflected from the specimen surface 3 as shown in FIG. 19 and their phase difference $\Delta$. A simple geometrical consideration shows that these ellipsoparameters $\psi$ and $\Delta$ can be computed by equations (2) and (3):

$$\cos(\Delta - \phi_i) = (I2 - I3)/(2I1)\{I1/(I2 + I3 - I1)\}^{\frac{1}{2}} \quad (2)$$

$$\tan\psi = \sigma^2 \tan p \{I1/(I2 + I3 - I1)\}^{\frac{1}{2}} \quad (3)$$

where the phase difference $\phi_i$ and amplitude ratio P are the ellipsoparameters of the incident light: for example, for a linearly polarized light of +45°, $\phi_i = 0°$, $\tan p = 1$; for a linearly polarized light of −45°, $\phi_i = 0°$, $\tan p = -1$. $\sigma$ is a unique value determined by the reflectivity in each direction of these beam splitters 4a to 4c. The $\sigma$ is obtained in advance by directing known elliptically polarized test light to the respective beam splitters 4a to 4c.

Once ellipsoparameters $\psi$ and $\Delta$ are obtained, the film thickness d can be computed using suitable equations.

With such an ellipsometer without moving parts, it is possible to measure at a high speed of 1000 points per second or more.

The number of parts in the optical system, however, is very large as shown in FIG. 18. To split the reflected light from the specimen surface 3 into the first, second, and third light, three beam splitters 4a to 4c are required. In addition, analyzers 5a to 5c have to be placed after the beam splitters 4a to 4c, respectively. Those optical members must be set precisely in terms of mutual angles including their solid angle. To achieve this, each of beam splitters 4a to 4c needs at least a thickness of 1 cm or more, and a height and length of nearly 5 cm. Thus, those beam splitters 4a to 4c alone occupy an area of approximately 15 cm².

The rotational angle of each of analyzers 5a to 5c have to be measured accurately before the thickness d of oxide films or the like is actually measured using the ellipsometer. This makes the rotational driving mechanisms of analyzers 5a, 5b, and 5c complicated. For instance, the analyzer had to be rotated 45° during the initial setting. Because of this, a single analyzer had to be as large as approximately 5 cm². To keep the analyzers away from each other, an installation place with a lateral direction of approximately 15 cm was needed.

Since the specimen surface 3 is far away from the respective photodetectors 7a to 7c, the reflected light from the specimen surface 3 spreads until it reaches the photodetectors 7a to 7c. For this reason, it is necessary to use condenser lenses 6a to 6c, theoretically unnecessary, to gather rays of light on the respective photodetectors 7a to 7c. As a result, the number of optical parts in the whole ellipsometer increase even more.

Since light attenuates when passing through each of beam splitters 4a to 4c, the light intensities I1 to I3 received by the photodetectors 7a to 7c become smaller, resulting in poorer S/N ratio. To avoid this problem, it is necessary to use, for example, a high-power laser device as the light source 1.

As noted above, in the conventional ellipsometer of FIG. 18, to assure the accuracy of the optical system, it is necessary to make the entire system more rigid and larger. Even when the smallest optical parts are used, a system composed of a light source section made up of the light source 1 and the polarizer 2 and a sensing section made up of the beam splitters 4a to 4c, photodetectors 7a to 7c, and related parts, requires an area of 50 cm² and a height of approximately 50 cm. It weighs 30 to 50 kg.

Such a large, heavy ellipsometer requires installation in a room such as a laboratory, and a specimen to be measured must be carried to the installation place.

In various manufacturing lines in the today's factory, there is an increasing need of monitoring the thickness of coating through on-line measurement of various types of paint or oil coated over the surface of a variety of belt-like products conveyed over the manufacturing lines.

In practice, however, it is impossible to install in such a manufacturing line an ellipsometer containing many optical members as well as a driving mechanism, as noted earlier.

DISCLOSURE OF INVENTION

A first object of the present invention is to provide an ellipsometer with a remarkably reduced number of optical parts such as beam splitters or analyzers, requiring no angle adjustment in measurement and making the entire system more compact and lightweight for portability.

A second object of the present invention is to provide an ellipsometer with a reduced number of optical parts, capable of greatly increasing the measuring speed and the measuring range while maintaining a high measuring accuracy, in addition to the above-mentioned object.

A third object is to provide a coating thickness control method by which the thickness of a coating applied on-line by a coating apparatus using the above ellipsometer can be controlled to a constant value accurately.

To achieve the first object, an ellipsometer of this invention comprises a nonpolarization beam splitter for dividing the light reflected from the object to be measured into light portions traveling along a first optical path and a second optical path, an analyzer for allowing a polarized light component in the reference direction of the light portion traveling along the first optical path to pass through, and a polarization beam splitter for dividing the light portion traveling along the second optical path into polarized light components in different directions with respect to the reference direction. The respective light beams passing through the analyzer and polarization beam splitter are received by a first, a second, and a third photodetector.

The term reference direction in this specification is assumed to be a direction serving as a reference in determining an angle, not limited to a particular fixed direction (such as direction p). The counterclockwise direction with respect to the reference direction is defined as the + direction, whereas the clockwise direction is defined as the − direction. Similarly, the reference direction in this invention is assumed to be a direction acting as a reference in determining an angle, and may be set arbitrarily.

with this configuration, the polarized light from the light source section is directed to the object to be measured at a specified angle. The light reflected by the object is changed, according to its thickness and physical properties, from the linearly polarized light into an elliptically polarized light as shown in FIG. 19. The reflected light of the elliptically polarized light is divided into two portions by the nonpolarization beam splitter: one traveling along one optical path, and the other moving along the other optical path. The light traveling along one optical path is directed to the first photodetector via the analyzer whose polarizing direction is set to the reference direction (with an angle of 0°) corresponding to the ordinate of FIG. 19, and the first photodetector senses a first light intensity I1.

The light split in the other direction by the nonpolarization beam splitter is introduced to a polarization beam splitter. This beam splitter separates the received light into polarized light components in different directions with respect to the reference direction. One light beam passing through the polarization beam splitter is led to the second photodetector, which senses a second light intensity I2. Further, the other light beam passing through the polarization beam splitter is directed to the third photodetector, which detects a third light intensity I3.

Since the respective light beams passing through the analyzer and polarization beam splitter have their own light intensity when the elliptically polarized light of FIG. 19 is viewed from different directions, the ellipsoparameters $\psi$ and $\Delta$ of the FIG. 19 elliptically polarized light can be computed from the first, the second, and the third light intensity I1, I2, and I3.

For an ellipsometer of the present invention, optical parts of minimum necessity include a light source section, a nonpolarization beam splitter, a polarization beam splitter, an analyzer, and three photodetectors, amounting to 7 elements in all. Consequently, the number of optical parts in the present invention is much smaller than that of optical parts required for the conventional ellipsometer shown in FIG. 18.

To achieve the second object, in an ellipsometer of the present invention, the reference direction is set to a direction parallel to the plane of incidence for the incident light on the object to be measured. On condition that the respective polarizing directions of the polarization beam splitter are set to +45° and −45° with respect to the reference direction, the ellipsoparameters $\psi$ and $\Delta$ are calculated by equations (4) and (5):

$$\cos(\Delta - \phi_i) = [(1+\sigma^2)(I2-I3)/4I1] \times [2I1/\{(1+\sigma^2)(I2+I3) - 2I1\}]^{\frac{1}{2}} \quad (4)$$

$$\tan\psi = \tan p[2\sigma^2 I1/\{(1+\sigma^2)(I2+I3) - 2I1\}]^{\frac{1}{2}} \quad (5)$$

where the phase difference $\phi_i$ and amplitude ratio p are the ellipsoparameters of the incident light, and $\sigma$ is a constant determined by the measuring system.

As a result of changing the construction of the conventional ellipsometer in FIG. 18 containing three nonpolarization beam splitters 4a to 4c and three analyzers 5a to 5c into an ellipsometer of the present invention containing a nonpolarization beam splitter, a polarization beam splitter, and an analyzer, equations (2) and (3) for obtaining ellipsoparameters are modified into equations (4) and (5). The reason for this will be explained below.

Equation (2) for computing the phase difference $\Delta$ for the conventional ellipsometer, one ellipsoparameter, is generally expressed as equation (6), being multiplied by coefficient C. What should be considered before applying to the present invention are:

(a) Since the reflection history and transmission history of the path along which the reflected light is directed from the specimen surface to each photodetector in the conventional ellipsometer are different from those in an ellipsometer of this invention, it is difficult to apply the conventional system to the present invention without any modification.

(b) The conventional system should be able to apply flexibly to the present invention even when there are changes in the properties of the specimen (such as the material or thickness of the film).

By multiplying coefficient C according to the value of $\Delta$, it is possible to apply the conventional system to the present invention, thereby increasing the flexibility and serviceability of the system.

$$\cos(\Delta - \phi_i) = C(I2 - I3)/(2I1)\{I1/(I2 + I3 - I1)\}^{\frac{1}{2}} \quad (6)$$

Before calculating equation (6), however, it is necessary to determine the value of coefficient C. This requires coefficient C to be obtained experimentally by directing a test light of a known polarized light to the beam splitter 4a. Actually, for measurement at an accuracy of a specified level or more, it is necessary to use 3 to 20 types of light of different polarizing directions to obtain coefficient C in each direction. Furthermore, it is necessary to use a different coefficient C thus obtained for each direction of the elliptically polarized light of the reflected light from the specimen surface 3 during actual measurement. Accordingly, to measure ellipsoparameters and film thickness at high accuracy requires a lot of time and labor.

For equation (3) for computing the amplitude ratio $\psi$, the other ellipsoparameter, it is necessary to determine the value of $\sigma$ in advance in a similar manner. In particular, to measure an unknown specimen accurately, it is essential to determine constant $\sigma$ beforehand. Because of the reflection history and transmission history of the conventional system differing from those of a system of this invention, it is impossible to accurately obtain the constant $\sigma$ also suited to the present invention.

When ellipsoparameters were computed using equations (2) and (3) in the conventional ellipsometer, the accuracy of calculations was low, and sometimes far away from the actual value. Especially, the deviation of magnitude ratio $\psi$ was noticeable. This is because the quality and thickness of the actual specimen were not uniform, and because the same equations could neither be used throughout a wide range of ellipsoparameters to be measured, nor cover the diversity of the specimen (such as variations in film quality or thickness).

In determining the film thickness of the specimen, $\Delta$ and $\psi$ are calculated alternately by a computer to converge the results at respective values. This makes the computer program complicated and the computing time longer. In this situation, inaccurate or complex equations would make the computing time much longer and the measuring accuracy even worse.

As noted above, the ellipsometer with the optical system shown in FIG. 18 has a problem: as far as ellipsoparameters are obtained by the aforementioned equations (2) and (3), the object to be measured must be limited to films whose material indicates small changes in the amplitude ratio $\psi$ and whose thickness lies in a particular range where the film thickness does not change greatly.

The procedure of deriving equations (4) and (5) in an ellipsometer of the present invention will be explained. The ellipsometer has a basic construction shown in FIG. 1.

What is considered first is the history of the reflected light from the specimen surfaces 3 and 16 to the respective photodetectors 7a to 7c, and 21a to 21c in the ellipsometer of the FIG. 18 optical system and in the ellipsometer of the FIG. 1 optical system.

The incident lights from the light sources on the specimen surfaces 3 and 16 are the same. The vector of the incident light is assumed to be Ei, and a vector change at the specimen surfaces 3 and 16 to be S. With the respective nonpolarization beam splitters 4a to 4c, and 18 in FIGS. 18 and 1, a vector change due to reflection is assumed to be Br, and a vector change due to transmission to be Bt.

With the respective analyzers 5a and 19 having an angle of 0° to the reference direction in FIGS. 18 and 1, a vector change due to light passing through these analyzers is assumed to be $R_0$. With the analyzers 5b and 5c and polarization beam splitter 20 having an angle of $+45°$ and $-45°$ to the reference direction in FIGS. 18 and 1, vector changes due to light passing through these analyzers and splitter are assumed to be $R_{+45}$ and $R_{-45}$, respectively.

The reference direction in the present invention is determined arbitrarily in determining angles for convenience sake, as mentioned earlier. Normally, direction p is selected as the reference direction, but the present invention is not limited to this selection.

The vectors $E_1$, $E_2$, and $E_3$ of the lights passing through the respective analyzers 5a, 5b, and 5c in FIG. 18 are expressed by equations (7), (8), and (9):

$$E_1 = R_0 \times Bt^2 \times S \times Ei \quad (7)$$

$$E_2 = R_{+45} \times Bt \times Br \times S \times Ei \quad (8)$$

$$E_3 = R_{-45} \times Bt \times Br \times S \times Ei \quad (9)$$

Solving equations (7), (8), and (9) give the aforementioned equations (2) and (3):

$$\cos(\Delta - \phi_i) = (I2 - I3)/(2I1)\{I1/(I2 + I3 - I1)\}^{\frac{1}{2}} \quad (2)$$

$$\tan\psi = \sigma^2 \tan p \{I1/(I2 + I3 - I1)\}^{\frac{1}{2}} \quad (3)$$

The term $Bt^2$ in equation (7) means that the reflected light passes through the beam splitter twice. The terms $[Bt \times Br]$ in equations (8) and (9) mean that the reflected light passes through the beam splitter once and is reflected once.

In a similar approach, the vectors $E_1$, $E_2$, and $E_3$ of the respective polarized light components with an angle of 0°, +45°, and −45° to the reference direction, supplied from the analyzer 19 and polarization beam splitter 20 in FIG. 1, are expressed by equations (10), (11), and (12):

$$E_1 = R_0 \times Br \times S \times Ei \tag{10}$$

$$E_2 = R_{+45} \times Bt \times S \times Ei \tag{11}$$

$$E_3 = R_{-45} \times Bt \times S \times Ei \tag{12}$$

As might be obvious from comparing equations (10), (11), and (12) corresponding to the FIG. 1 optical system with equations (7), (8), and (9) corresponding to the FIG. 18 optical system, the vector value for each polarized light component varies greatly depending on differences in the reflection and transmission histories on the optical path along which the reflected light travels from the specimen surface to each photodetector, even if they finally become the same polarized light components with an angle of 0°, +45°, and −45°. The equations for obtaining ellipsoparameters $\Delta$ and $\psi$ using those values are affected accordingly. Since the nonpolarization beam splitter 18 retains $\Delta$ only and not $\psi$, ellipsoparameter $\psi$ is thus affected much.

Because vectors of a change in the light received at the specimen surface is dependent on the respective parameters $\Delta$ and $\psi$, vectors is expressed by equation (13):

$$S = Rs \begin{bmatrix} \tan\psi e^{j\Delta} & 0 \\ 0 & 1 \end{bmatrix} \tag{13}$$

where $Rs$ is a Fresnel coefficient of the component (polarized light component S) crossing the plane of incidence at right angles at the specimen surface.

The aforesaid constant $\sigma$ is expressed by equation (14) in terms of Fresnel reflection coefficients $r_s$ and $r_p$ of component S and component P at the beam splitter surface:

$$\sigma = (1 - r_s^2)/(1 - r_p^2) \tag{14}$$

Solving equations (10) to (14) for $\Delta$ and $\psi$ gives the aforementioned equations (4) and (5):

$$\cos(\Delta - \phi i) = [(1+\sigma^2)(I2-I3)/4I1] \times [2I1/\{(1+\sigma^2)(I2+I3) - 2I1\}]^{\frac{1}{2}} \tag{4}$$

$$\tan\psi = \tan p [2\sigma^2 I1/\{(1+\sigma^2)(I2+I3) - 2I1\}]^{\frac{1}{2}} \tag{5}$$

where the phase difference $\phi_i$ and amplitude ratio p are the ellipsoparameters of the incident light. The light incident on the specimen surface is generally set, using a ¼ wavelength plate, to condition A (without a ¼ wavelength plate): phase difference $\phi_i = 0°$, amplitude ratio $\tan p = 1$ ($p = 45°$); or to condition B (with a ¼ wavelength plate): phase difference $\phi_i = 90°$, amplitude ratio $\tan p = 1$ ($p = 45°$).

For condition A, equations (4) and (5) turn into equations (15) and (16), respectively:

$$\cos\Delta = [(1+\sigma^2)(I2-I3)/4I1] \times [2I1/\{(1+\sigma^2)(I2+I3) - 2I1\}]^{\frac{1}{2}} \tag{15}$$

$$\tan\psi = [2\sigma^2 I1/\{(1+\sigma^2)(I2+I3) - 2I1\}]^{\frac{1}{2}} \tag{16}$$

For condition B, equations (4) and (5) turn into equations (17) and (18), respectively:

$$\sin\Delta = [(1+\sigma^2)(I2-I3)/4I1] \times [2I1/\{(1+\sigma^2)(I2+I3) - 2I1\}]^{\frac{1}{2}} \tag{17}$$

$$\tan\psi = [2\sigma^2 I1/\{(1+\sigma^2)(I2+I3) - 2I1\}]^{\frac{1}{2}} \tag{18}$$

As explained so far, equations (4) and (5) corresponding to the FIG. 1 optical system differ in the position of a from equations (2) and (3) corresponding to the FIG. 18 optical system. To obtain correct or highly accurate ellipsoparameters $\Delta$ and $\psi$, it is necessary to use equations (4) and (5).

Under conditions where constant $\sigma$ is 1, equations (4) and (5) agree with equations (2) and (3). In the optical system of FIG. 18, however, constant a ranges from 1.2 to 1.5, whereas in the FIG. 1 optical system, constant a ranges from 0.5 to 0.8. Thus, the fact is that conditions where constant $\sigma$ obtained from each reflectivity is 1 hardly exist.

For this reason, to extract a polarized light component with an angle of 0° from the reflected light from the specimen surface after a first reflection, and to extract polarized light components with an angle of +45° and −45° from the reflected light from the specimen surface after a first transmission, the ellipsometer of the present invention is provided with a nonpolarization beam splitter, an analyzer, a polarization beam splitter, three photodetectors, and a computing section made up of, for example, software for calculating equations (4) and (5).

To achieve the third object, in a coating thickness control method of the present invention, a first and a second ellipsometer is provided before and after a coating apparatus installed along the transport path over which a belt-like plate to be coated is conveyed. The first ellipsometer obtains a first ellipsoparameter for the surface of the plate before coating, and the second ellipsometer obtains a second ellipsoparameter for the surface of the plate after coating. Based on the difference between the first and second ellipsoparameters, the coating apparatus controls the coating thickness. 10 The control is based on the fact that the difference between the ellipsoparameters is related to the coating thickness (particularly, when the coating thickness is small, the difference between ellipsoparameters is proportional to coating thickness). To measure the ellipsoparameter difference with a single ellipsometer, it is necessary that the refractive index of the surface of the plate to be coated should be constant. Obtaining the coating thickness based on the ellipsoparameter difference using two ellipsometers makes it possible to always obtain the coating thickness accurately, even if the refractive index of the plate being coated changes. Since, in actual processes, the refractive index at the surface of the plate being coated changes gradually with time, the method of the present invention is effective.

BRIEF DESCRIPTION OF DRAWINGS

FIG. 3 illustrates how to operate the measuring head manually;

FIG. 4 is a signal-processing time chart for the signal processing section of the embodiment;

FIG. 11 is a schematic diagram of a coating thickness measuring apparatus employing the embodiments;

FIG. 14 is a block diagram showing an electrical arrangement of the coating thickness measuring apparatus;

FIG. 17 is a block diagram showing an electrical arrangement of the film thickness distribution measuring apparatus;

BEST MODE OF CARRYING OUT THE INVENTION

An embodiment of the present invention will be explained, referring to the accompanying drawings.

Figure 1:
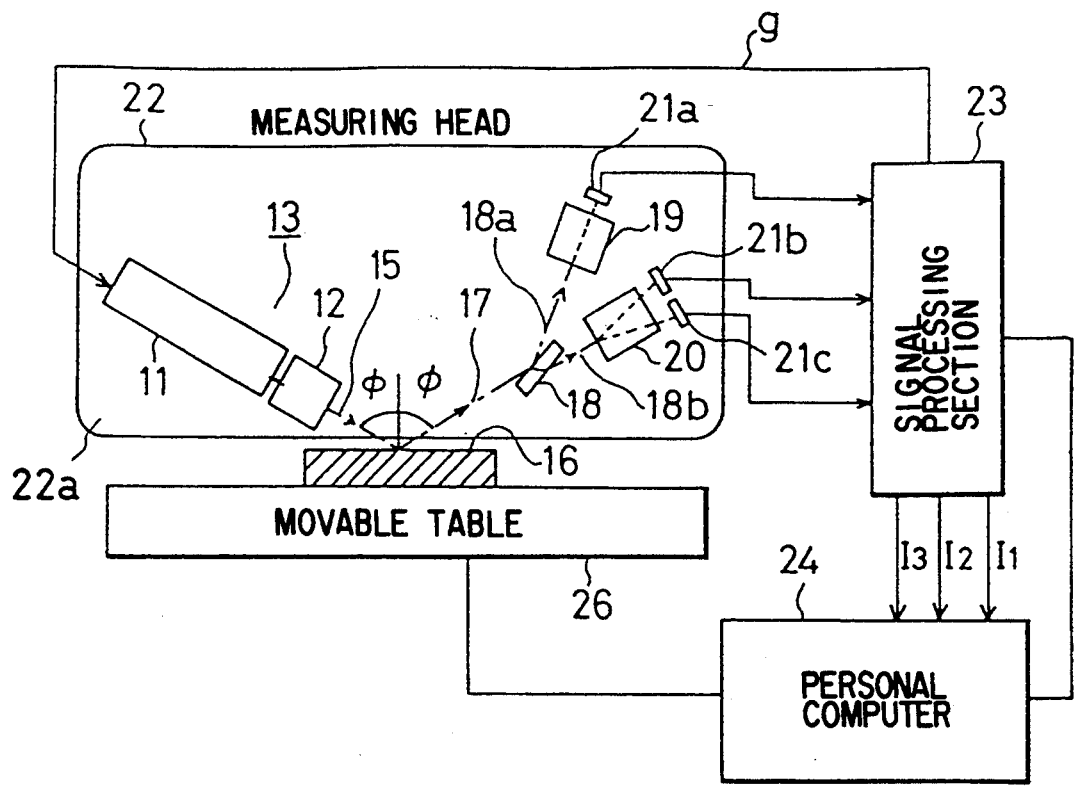
FIG. 1 is a diagram showing a general construction of an ellipsometer according to an embodiment of the present invention.

FIG. 1 is a block diagram showing the entire ellipsometer of the embodiment. Respective analog light intensities I1, I2, and I3 from a measuring head 22, which contains many optical parts, are converted into digital values by a signal processing section 23, and these digital values are supplied to a personal computer 24 acting as a computing section.

The personal computer 24 calculates equations (4) and (5) using light intensities I1, I2, and I3 to determine ellipsoparameters $\psi$ and $\Delta$. It also calculates the film thickness d of the specimen surface 16, the object to be measured, by a specified equation, using the calculated ellipsoparameters $\psi$ and $\Delta$. After the calculation of film thickness d at a measuring point has finished, the computer 24 moves an XY movable table 26 on which the object to be measured is mounted, and then starts to measure the film thickness d of the next measuring point on the specimen surface 16.

In the measuring head 22, a laser beam of a single wavelength emitted from a semiconductor laser light source 11 is converted into linearly polarized light by a polarizer 12. The semiconductor laser light source 11 and polarizer 12 form a light source section 13. The incident light 15 converted into linearly polarized light is directed from the light source section 13 to the specimen surface 16 at an angle of $\phi$. Because of the existence of the film of specimen surface 16, the reflected 17 light from the specimen surface 16 changes from linearly polarized light to elliptically polarized light, which is then directed to a nonpolarization beam splitter 18.

The nonpolarization beam splitter 18 is made up of, for example, an unpolarizing glass plate. The reflected light 17 is split into two light beams 18a and 18b that maintain the phase difference $\Delta$ between wave P and wave S. The reflected light 18a is directed to an analyzer 19. The analyzer 19 is positioned so that the polarizing direction of the transmitted light may have an angle of 0° to the reference direction described earlier. The polarized light component with an angle of 0° of the reflected light 18a (the reflected light 17) from the analyzer 19 is sensed by a photodetector 21a to determine its light intensity I1.

The transmitted light 18b from a nonpolarization beam splitter 18 is directed to a polarization beam splitter 20. The polarization beam splitter 20 separates the transmitted light 18b of the elliptically polarized light into two polarized light components in directions crossing each other at right angles. The polarization beam splitter 20 is positioned so that the polarizing direction of one polarized component may have an angle of +45° in counterclockwise direction to the reference direction when viewed from the photodetector 21b. Thus, the incident light on the photodetector 21b is converted into the light intensity I2 of the polarized light component with an angle of +45° of the transmitted light 18b (the reflected light 17). The other light from the polarization beam splitter 20 becomes a polarized light component with an angle of −45° to the reference direction. A photodetector 21c produces the light intensity I3 of the polarized light component with an angle of −45° of the reflected light 17.

Figure 2:
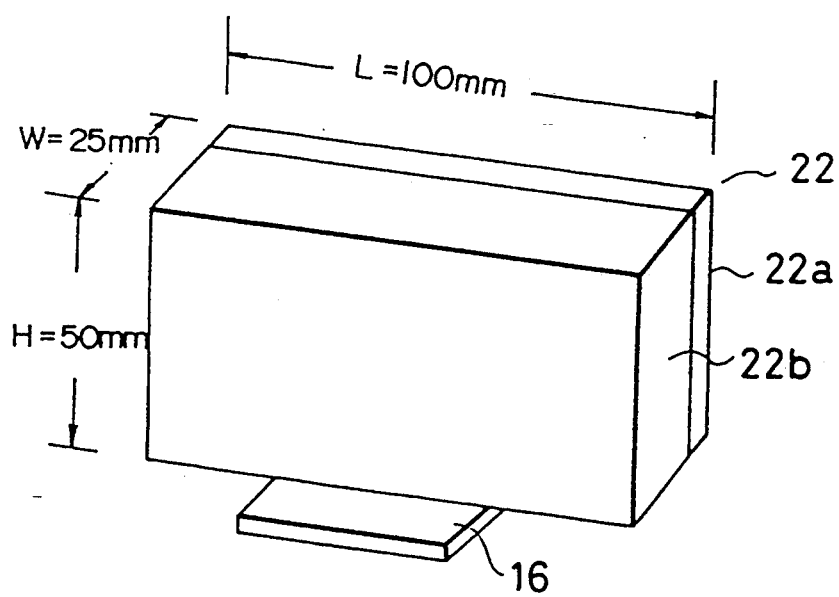
FIG. 2 is a perspective view of the measuring head of the embodiment.

The respective optical parts, including the light source section 13, beam splitters 18 and 20, analyzer 19, and photodetectors 21a to 21c, are mounted on a plate 22a made of light metal. All the optical parts are covered with a rectangular box-like case 22b, as shown in FIG. 2.

The size and weight of the measuring head 22, as shown in FIG. 3, are such that the operator can hold it with one hand and press it against the specimen surface 16 for measurement. For the measuring head 22 in the embodiment, the size including the plate 22a and case 22b has a length L of 100 mm, a height H of 50 mm, and a width W of 25 mm, and its weight is 300 g.

As compared with a conventional ordinary ellipsometer, the measuring head 22 of the embodiment is made as compact as 1/700 to 1/1000 in volume and as light as 1/80 to 1/120 in weight of the conventional ellipsometer.

In FIG. 1, the signal processing section 23 supplies to the light source section 13 a rectangular wave signal g of a constant period shown in FIG. 4, to cause the light intensity of the incident light 15 to change in rectangular wave. As a result, the level of the light intensity signal from each of photodetectors 21a to 21c also varies in the period of the rectangular signal g, as shown in FIG. 4. The signal processing section 23 then detects the difference between the highest and lowest levels of each light intensity signal as new light intensity, A-D converts each detected light intensity, and supplies them as digital light intensities I1, I2, and I3 to the personal computer 24.

$$I1 = I_{1H} - I_{1L} \quad I2 = I_{2H} - I_{2L} \quad I3 = I_{3H} - I_{3L}$$

The computer 24 controls the oscillation of the rectangular signal g and the extraction of light intensities I1, I2, and I3 at the signal processing section 23. The computer 24 calculates the film thickness d of the specimen surface 16, following the flowchart of FIG. 5.

According to the flowchart, the computer 24 reads light intensities I1, I2, and I3 from the signal processing section 23, and calculates ellipsoparameters $\Delta$ and $\psi$ by equations (15) and (16) under condition A (without the ¼ wavelength plate). Here, constant $\sigma$ has been already measured using test light, as described earlier. When the calculated phase difference $\Delta$ is a value close to 0° or 180°, the film thickness d is 0 or a particular value determined by the wavelength of the incident light 15 and others.

When the calculated phase difference $\Delta$ is a value close to neither 0° nor 180°, the personal computer 24 performs a specified operation on the obtained ellipsoparameters $\Delta$ and $\psi$ to determine the film thickness d of the specimen surface 16. The calculation result is displayed on, for example, a CRT display device and is printed on a printer.

Figure 6:
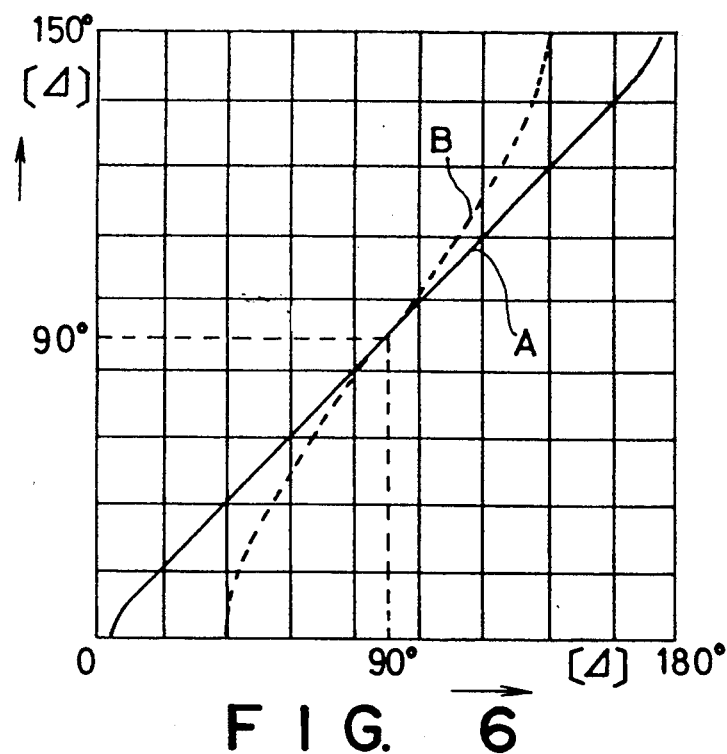
FIG. 6 is a characteristic diagram of ellipsoparameter $\Delta$ measured by the embodiment.

The effects of the ellipsometer thus constructed will be explained, referring to the measurement results shown in FIG. 6. FIG. 6 depicts the results of measuring ellipsoparameter $\Delta$ for materials with various film thickness d, using linearly polarized light with a polarized direction of +45° and a phase difference $\Delta$ of 0°. The abscissa of FIG. 6 indicates the correct phase difference $\Delta$ measured with the ellipsometer having the FIG. 18 optical system. The ordinate represents the phase difference $\Delta$ measured with the ellipsometer of the FIG. 1 embodiment. In the figure, characteristic A shows the phase difference $\Delta$ obtained by equation (4).

For ellipsometers, the measured phase difference $\Delta$ is required to have a repeatability of 1° or less, and a measurement error of less than 0.5% in the full range of 0° to 180°.

Thus, when equation (4) in the embodiment is used, the phase difference $\Delta$ measured has a one-to-one correspondence with the correct phase difference on the abscissa. With the ellipsometer of the embodiment, constant $\sigma$ may be determined by calibration at an angle of 90° only, taking into account the fact that the phase differences 0° and 180° are peculiar phase differences $\Delta$ corresponding to a state in which no film exists.

In contrast to this, characteristic B shows the phase difference $\Delta$ calculated by conventional equation (2) in the ellipsometer of the embodiment. As can be seen from characteristic B, correct values are obtained near 90° or the calibration point for computing $\sigma$. As the phase difference $\Delta$ gets farther away from 90°, however, the characteristic deviates from the correct values significantly. For example, to reduce the amount of error from the correct value in the full phase difference range to less than 1% in equation (2), it is necessary to measure constant C ($\sigma$) for each phase difference $\Delta$ in advance by setting 10 or more calibration points in the phase difference range of 0° to 180°.

Figure 7:
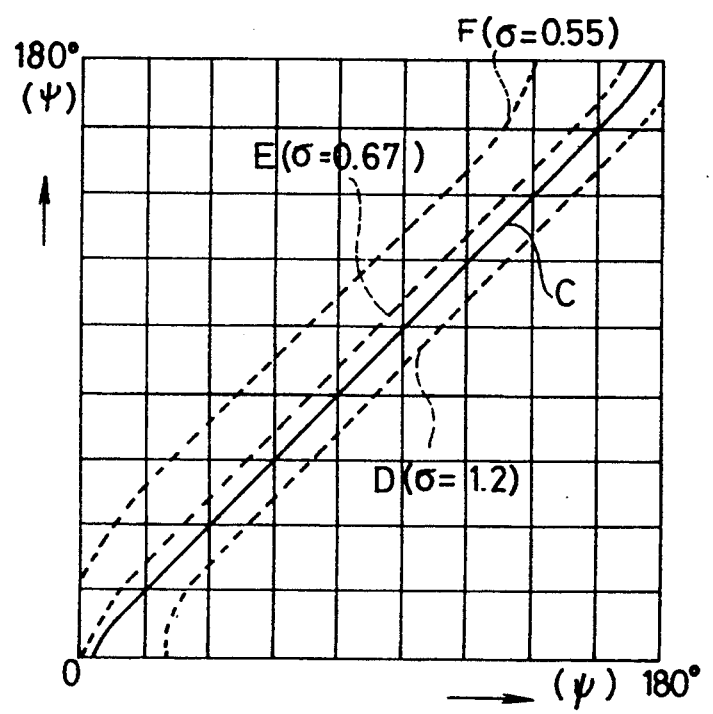
FIG. 7 is a characteristic diagram of ellipsoparameter $\psi$ measured by the embodiment.

FIG. 7 shows the results of measuring ellipsoparameter $\psi$ for various materials using the same incident light as that in FIG. 6. The abscissa of FIG. 7 indicates the correct $\psi$ value measured with the ellipsometer having the FIG. 18 optical system. The ordinate represents the $\psi$ measured with the ellipsometer of the FIG. 1 embodiment. In the figure, characteristic C shows $\psi$ obtained by equation (5). Characteristics D, E, and F show $\psi$ calculated from equation (3) with the ellipsometer of the embodiment, where $\sigma$ is set to 1.2, 0.67, and 0.55, respectively.

When a conventional method based on equation (3) is used, setting $\sigma$ to a particular value permits the deviation from the correct value to vary with the object to be measured, with the result that the characteristic shifts upwards or downwards in parallel motion. The cause of this may be that the $\psi$ value primarily depends on the absorbancy of the material of the object to be measured. Limited use of this method is possible provided that the deviation from the correct value is previously measured for each material by another method such as a rotational analyzer method. However, it cannot be applied to measurement of new unknown material. In practice, even if the same material is used, optical constants such as refractive index or absorbancy vary depending on the existence of impurities, surface roughness, and measurement direction in the case of anisotropic material or installation direction of the specimen. Therefore, it may be said that the reliability of ellipsoparameter $\psi$ obtained from equation (3) is poor.

In contrast, as for characteristic C calculated from equation (5), it can be understood that setting a single $\psi$ makes it possible to obtain almost correct ellipsoparameter $\psi$ in the whole range, independent of the material of the object to be measured.

A consideration will be given to a program for computing ellipsoparameters $\Delta$ and $\psi$ actually used in the person al computer 24.

Figure 5:
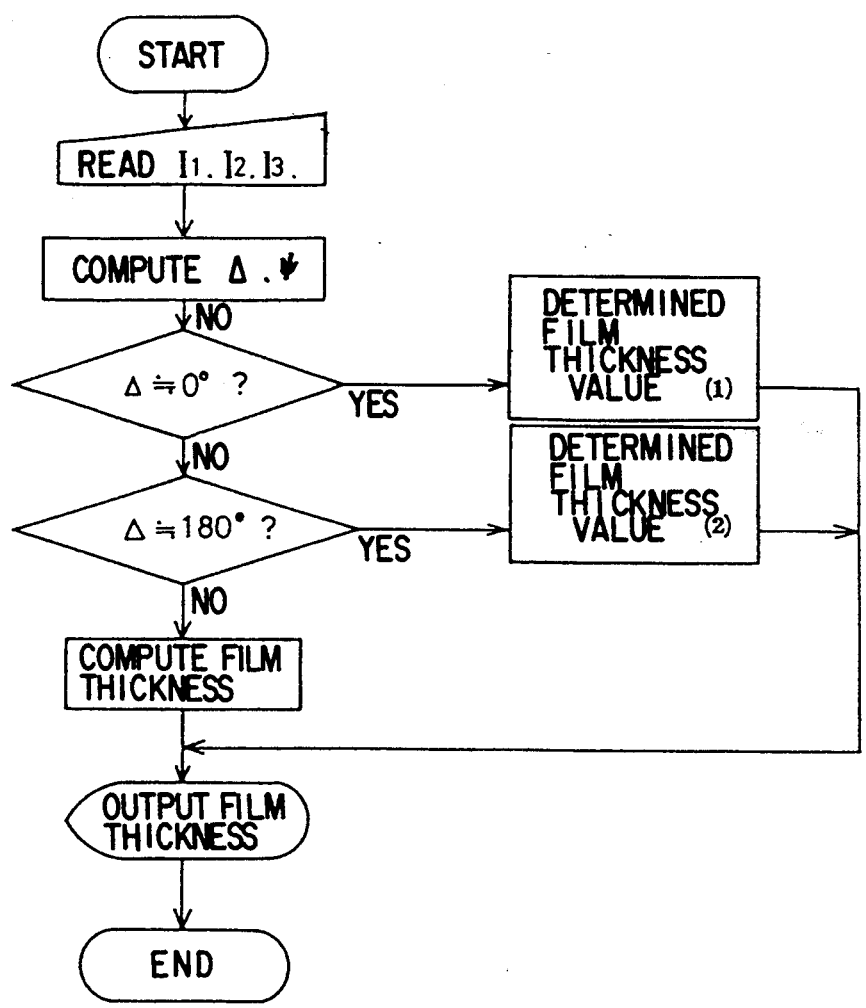
FIG. 5 is a flowchart of computing ellipsoparameters with the embodiment.
Figure 8:
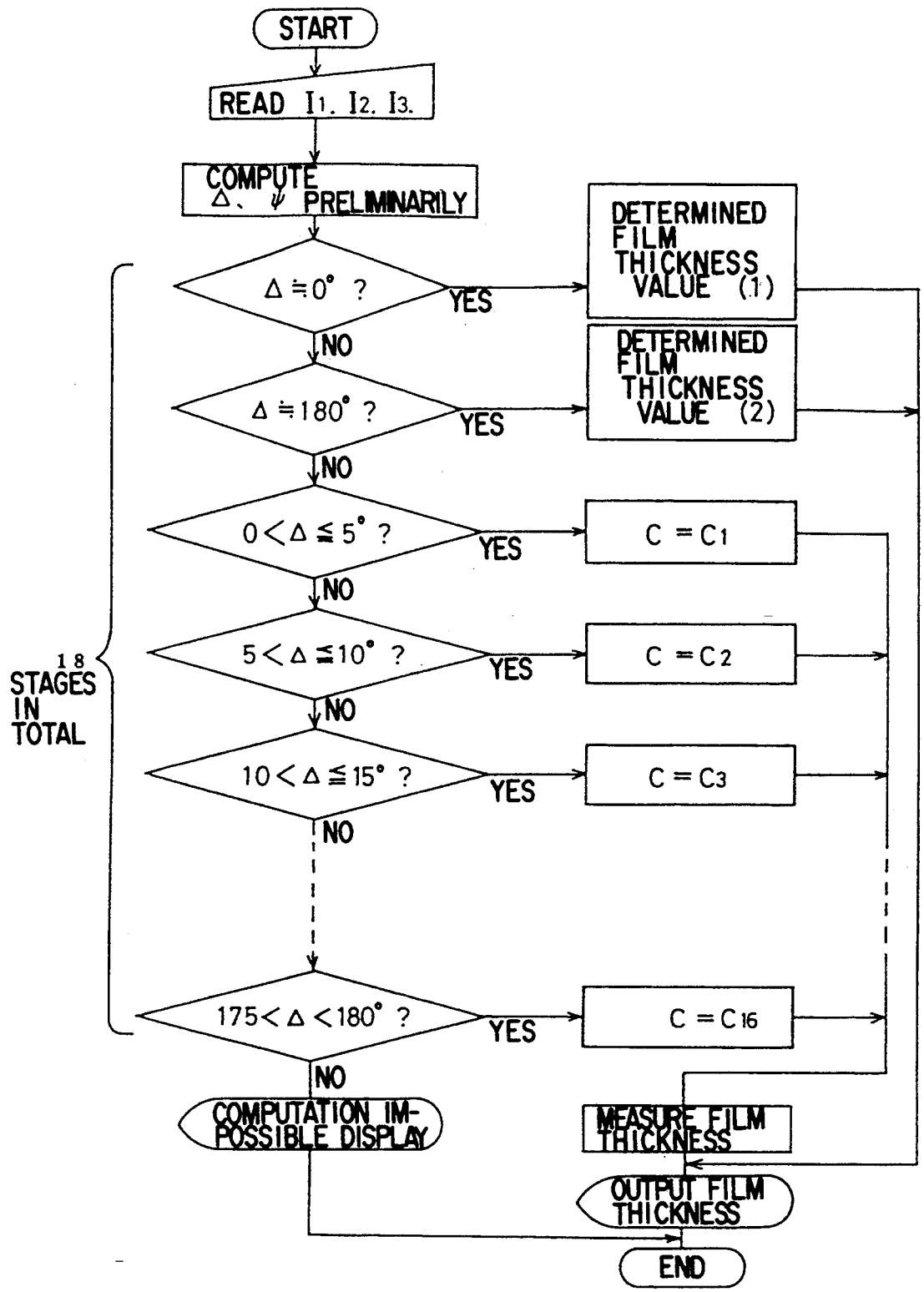
FIG. 8 is a flowchart of signal processing by conventional equations.

FIG. 5 is a flowchart of computing ellipsoparameters $\Delta$ and $\psi$ and film thickness d using equations (4) and (5) in the ellipsometer of the embodiment. FIG. 8 is a flowchart of computing ellipsoparameters $\Delta$ and $\psi$ and film thickness d using conventional equations (2) and (3) in the ellipsometer of the embodiment.

In the flowchart of FIG. 8, to calculate the phase difference $\Delta$ using conventional equations with an accuracy of, for example, 0.5% in the full phase difference range of 0° to 180°, it is necessary to previously divide the full phase difference range of 0° to 180° into 18 equal parts, and then obtain constant C ($=\sigma$) corresponding to each phase difference area. Then, it is determined which phase difference area the preliminarily measured phase difference $\Delta$ belongs to. By using constant C ($=\sigma$) specified for the determined phase difference area, calculation of ellipsoparameters $\Delta$ and $\psi$ are executed again. Based on the ellipsoparameters $\Delta$ and $\psi$ obtained from this recalculation, the film thickness d of the specimen surface is computed.

Since the program not only becomes complicated, but also requires several tens of judgments where the phase difference Δ is close to 180°, measurement of film thickness d for one measurement point needs a lot of time.

In contrast to this, the FIG. 5 program requires only two judgments. Because the constant ($=\sigma$) is a fixed value obtained beforehand, it is not necessary to perform preliminary computation on ellipsoparameters Δ and ψ, but only one computation. Thus, as compared with the conventional program of FIG. 8, the program is quite simplified and its calculation speed is improved greatly. For example, the present program was nearly 20 times as fast as the FIG. 8 program when 18 judgments were made.

For example, to measure a film thickness in the formation process of a steel sheet continuously moving in an iron mill, 10 measuring heads of FIG. 1 were actually installed across the width of the steel sheet, and the processing speed of a single personal computer 24 was measured for a case of using conventional equations (2) and (3) and a case of using equations (4) and (5) of the embodiment. In the case of using equations (2) and (3), one personal computer 24 could control only one measuring head 24, but in the case of equations (4) and (5), the single personal computer 24 could easily control 10 measuring heads 22. This makes it possible to reduce the number of personal computers needed, thereby decreasing the cost of equipment remarkably.

Figure 9:
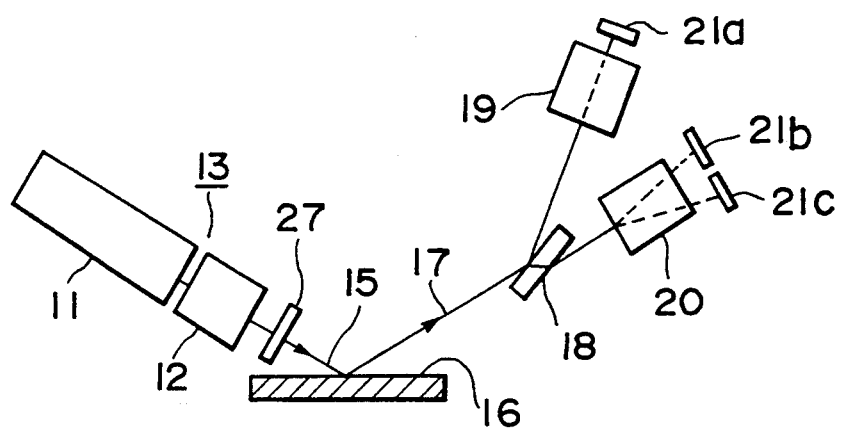
FIG. 9 is a schematic view of a measuring head of an ellipsometer according to another embodiment of the present invention.

FIG. 9 is a schematic diagram of the measuring head of an ellipsometer according to another embodiment of the present invention. The same parts as those in FIG. 1 are indicated by the same reference characters.

In this embodiment, a ¼ wavelength plate 27 is provided detachably in the optical path of the incident light 15 on the specimen surface 16 or the reflected light 17. When the difference between light intensities I1, I2, and I3 is extremely large, the ¼ wavelength plate 27 is inserted or removed to prevent the difference from becoming extremely large, thereby making it possible to improve the measurement accuracy.

Figure 10:
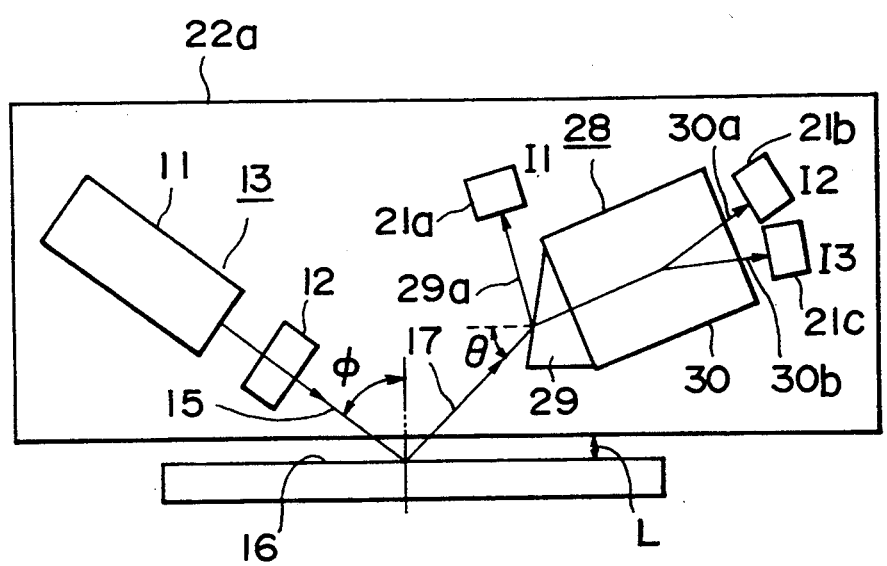
FIG. 10 is a schematic view of a measuring head of an ellipsometer according to still another embodiment of the present invention.

FIG. 10 is a schematic diagram of the measuring head of an ellipsometer according to still another embodiment of the present invention. The same parts as those in FIG. 1 are indicated by the same reference characters.

Secured flush on a plate 22a of light metal such as a 10 mm-thick aluminum alloy are a light source section 13 made up of a laser light source 11 and a polarizer 12, a composite polarization beam splitter 28 composed integrally of an unpolarizing glass 29 and a polarization beam splitter 30, a first photodetector 21a, a second photodetector 21b, and a third photodetector 21c.

Figure 19:
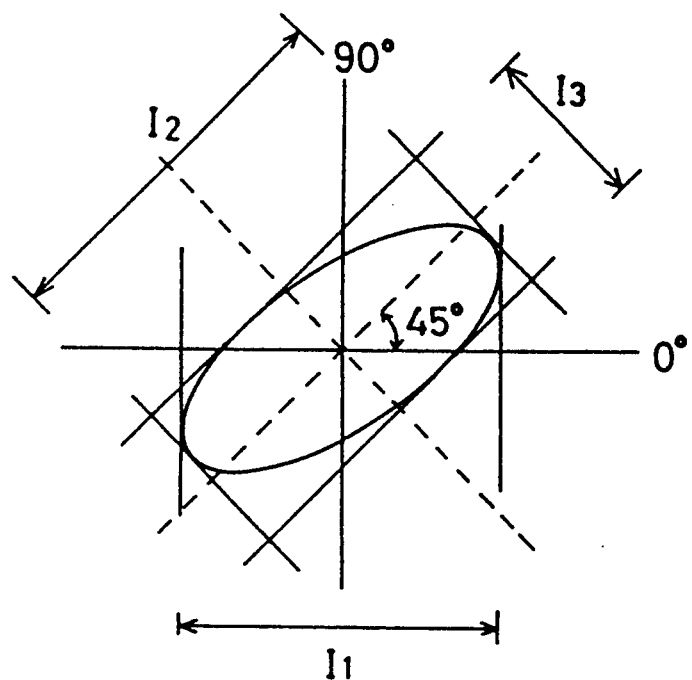
FIG. 19 illustrates the elliptically polarized light of ordinary reflected light.

The linearly polarized incident light 15 from the light source section 13 is reflected by the specimen surface 15. The reflected light 17 from the specimen surface 16 is converted from the linearly polarized light to an elliptically polarized light shown in FIG. 19, and then is directed to the incident surface of the unpolarizing glass 29 of the composite polarization beam splitter 28.

The unpolarizing glass 29 is formed of a prism with a triangular cross section. The emitting surface plane of the unpolarizing glass 29 opposite to its incident surface is connected to the incident surface of the polarization beam splitter 30. The polarization beam splitter 30 is positioned on the plate 22a so that the reflected light 17 from the specimen surface 16 may be directed to the incident surface at a Brewster angle of θ.

As is generally known, incident light at a Brewster angle of θ is divided into the light reflected at the incident surface and the transmitted light going inside. The reflected light has only a polarized light component parallel to the incidence plane (the reflective plane).

In this way, the light reflected by the incidence plane (the reflective plane) is a first polarized light component 29a with a polarizing direction (the reference direction) parallel only to the incidence plane. On the other hand, the transmitted light entering the unpolarizing glass 29 through the incidence surface is refracted at a refractive index determined by the physical properties of the unpolarizing glass 29 and is directed from its emitting surface on the opposite side to the polarization beam splitter 30. In this case, the shape of the cross section of the unpolarizing glass 29 is designed so that the transmitted light may meet the emitting surface at right angles. Thus, the trans mitted light is introduced to the incidence surface of the polarization beam splitter 30 at right angles.

The polarization beam splitter 30 is made up of, for example, a Wollaston prism. It separates the incident light from the unpolarizing glass 29 into a second and third polarized light components 30a and 30b whose polarizing directions differ 90° from each other. The polarization beam splitter 30 is mounted on the unpolarizing glass 29 so that the polarizing direction of the second polarized light component 30a may have an angle of +45° to the reference direction equal to the polarizing direction of the first polarized light component 29a, and that the polarizing direction of the third polarized light component 30b may have an angle of −45° to the reference direction.

The unpolarizing glass 29 and polarization beam splitter 30 are optically combined so as to form a physically integral member. Specifically, those two smooth joint surfaces are bonded together directly or with a suitable optical oil commercially available whose refractive index is close to that of glass. This joined state is maintained by a gripping mechanism (not shown) such as a hard resin container or a screw mechanism. Those two elements are physically integrated into one member.

What is considered as another optically joined state is that two smooth joint areas are kept apart parallel to each other or that the space between two joint areas is filled with a commercially available optical oil. This separated state may also achieved by a suitable gripping mechanism (not shown). When two joint areas are not bonded together, it can hardly be said that they physically form one member. The present invention, however, includes such an application. Material used to fill the space between two joint areas is not limited to the above optical oil.

Light leaves the unpolarizing glass 29 at right angles to its emitting surface, and enters the polarization beam splitter 30 at right angles to its incidence surface, thereby maintaining the polarized light state. Any isotropic substance that allows light to pass through may be used as filler material. Thus, there may be a case where an adhesive physically bonding the unpolarizing glass 29 to the polarization beam splitter 30 is acceptable.

In this way, the first, second, and third polarized light components 29a, 30a, and 30b, whose polarizing directions are set to the reference direction, +45° direction, and −45° direction, are directed to photodetectors 21a, 21b, and 21c, respectively. As a result, photodetectors 21a, 21b, and 21c produce light intensities I1, I2, and I3 of the elliptically polarized light of the reflected light 17 shown in FIG. 19, respectively.

Figure 18:
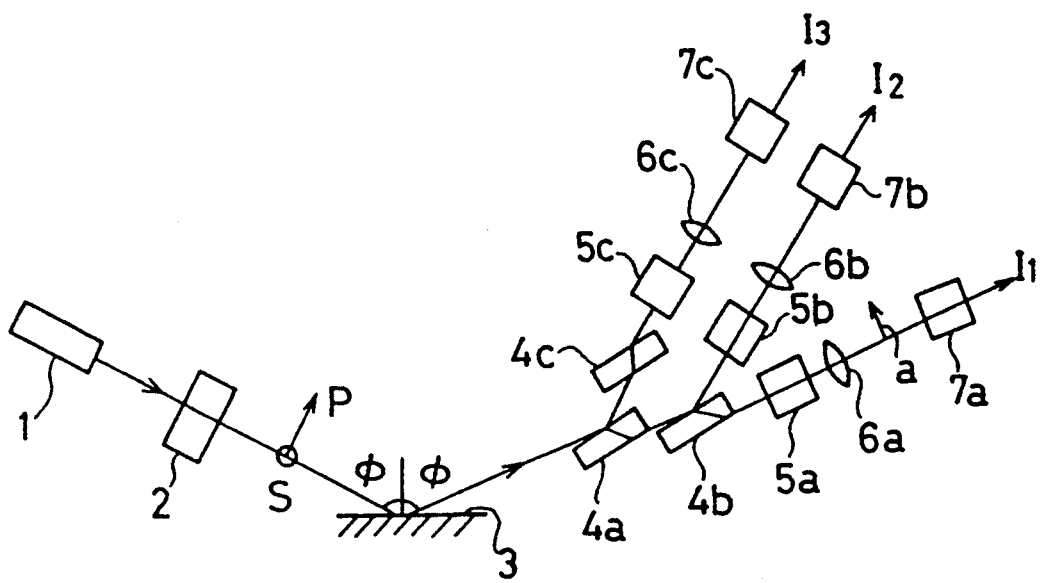
FIG. 18 is a diagram showing a general construction of a conventional ellipsometer.

With the ellipsometer constructed as shown in FIG. 10, consideration will be given to how ellipsoparameters are expressed in a manner to that used in the FIG. 18 optical system. Vectors $E_1$, $E_2$, and $E_3$ of the polarized light components, from the composite polarization beam splitter 28, with an angle of 0°, +45°, and −45° to the reference direction, are expressed by equations (10a), (11a), and (12a), respectively:

$$E_1 = Br \times S \times Ei \tag{10a}$$

$$E_2 = R_{+45} \times Bt \times S \times Ei \tag{11a}$$

$$E_3 = R_{-45} \times Bt \times S \times Ei \tag{12a}$$

where S is a vector expressed by equation (13) noted earlier. In this optical system, constant $\sigma$ is expressed by equation (14a):

$$\sigma = (1 - r_s)/(1 - r_p) \tag{14a}$$

It should be noticed that Fresnel reflection coefficient $r_{01p}$ is $r_{01p} = 0$ because the incident angle with the unpolarizing glass 29 is adjusted to a Brewster angle. Keeping this in mind, solving equations (10a) to (12a), (13), and (14a) for $\Delta$ and $\psi$ gives equations (4a) and (5a):

$$\cos(\Delta - \phi_i) = [(1+\sigma^2)(I2-I3)/4\sigma I1] \times [2I1/\{(1+\sigma^2)(I2+I3)-2\sigma^2 I1\}]^{\frac{1}{2}} \tag{4a}$$

$$\tan\psi = \tan p [\{(1+\sigma^2)(I2+I3)-2\sigma^2 I1\}/2I1]^{\frac{1}{2}} \tag{5a}$$

Adjusting the light incident on the specimen using the ¼ wavelength plate allows the aforementioned conditions A and B to be set for the ellipsoparameters $\phi_i$ and p of the incident light. For condition A, equations (4a) and (5a) turn to equations (15a) and (16a):

$$\cos\Delta = [(1+\sigma^2)(I2-I3)/4\sigma I1] \times [2I1/\{(1+\sigma^2)(I2+I3)-2\sigma^2 I1\}]^{\frac{1}{2}} \tag{15a}$$

$$\tan\psi = [\{(1+\sigma^2)(I2+I3)-2\sigma^2 I1\}/2I1]^{\frac{1}{2}} \tag{16a}$$

For condition B, equations (4a) and (5a) turn to equations (17a) and (18a):

$$\sin\Delta = [(1+\sigma^2)(I2-I3)/4\sigma I1] \times [2I1/\{(1+\sigma^2)(I2+I3)-2\sigma^2 I1\}]^{\frac{1}{2}} \tag{17a}$$

$$\tan\psi = [\{(1+\sigma^2)(I2+I3)-2\sigma^2 I1\}/2I1]^{\frac{1}{2}} \tag{18a}$$

The personal computer 24 calculates ellipsoparameters $\Delta$ and $\psi$ using equations (4a) and (5a). Finally, the film thickness d of the specimen surface 16 is obtained.

As shown in FIG. 10, in the ellipsometer of this arrangement, optical parts mounted on the plate 22a within the measuring head 22 are only the composite polarization beam splitter 28 and the laser light source 11 and polarizer 12 constituting the light source section 13, aside from three photodetectors 21a, 21b, and 21c. Thus, the number of optical components is far smaller than that for the conventional ellipsometer of FIG. 18.

Since the composite polarization beam splitter 28, which separates the incident light into three polarized light components in the reference direction, and in directions with an angle of +45° and −45° to the reference direction, is composed of only one optical part, it is unnecessary to adjust the polarizing direction between two analyzers, unlike the conventional equivalent. Securing the composite polarization beam splitter 28 to the plate 22a eliminates an additional rotational adjusting mechanism.

The composite polarization beam splitter 28, where the unpolarizing glass 29 and polarization beam splitter 30 are bonded together with a particular relationship between them, is an integral part not more than 5 mm² to 30 mm². Thus, the size of the entire sensing section containing the composite polarization beam splitter 28 and peripheral parts including photodetectors 21a to 21c is up to 5 cm² and nearly 2 cm in height. It weighs 200 g or less.

Thus, the measuring head 22 can be made even more compact and lightweight than the FIG. 1 embodiment. Use of suitable manufacturing techniques makes the composite polarization beam splitter 28 much more compact and lightweight.

As with the FIG. 9 embodiment, in the FIG. 10 embodiment, it is possible to provide an detachable ¼ wavelength plate 27 in the optical path of the incident light 15 on the specimen surface or of the reflected light 17. Since in FIG. 9, equations (4) and (5) turn to equations (15) and (16) or (17) and (18), depending on adjustment due to insertion or removal of the wavelength plate 27, the personal computer 24 calculates ellipsoparameters $\Delta$ and $\psi$ based on either pair of equations. In FIG. 10, because equations (4a) and (5a) turn to equations (15a) and (16a) or (17a) and (18a), depending on adjustment due to insertion or removal of the wavelength plate 27, ellipsoparameters $\Delta$ and $\psi$ are obtained from either pair of equations.

Although the ellipsometer shown in FIG. 10 is more compact and lightweight than the ellipsometer shown in FIG. 9 (or FIG. 1), it is affected more easily by a change in the distance between the object being measured and the optical system because the optical element 29 splitting light at a Brewster angle is fixed. For this reason, the ellipsometer of FIG. 9 (or FIG. 1) is more suitable for highly accurate measurement.

The composite polarization beam splitter 28 constructed as shown in FIG. 10 is just one component part of an ellipsometer of the present invention. The composite polarization beam splitter 28 has the function of dividing the input optical information in a small place into three pieces of optical information carrying light-intensity data and polarization data. Therefore, the composite polarization beam splitter 28 may be applied to optical information equipment such as an optical path splitter coupler or an optical waveguide, not limited to the above-mentioned ellipsometer.

Figure 20:
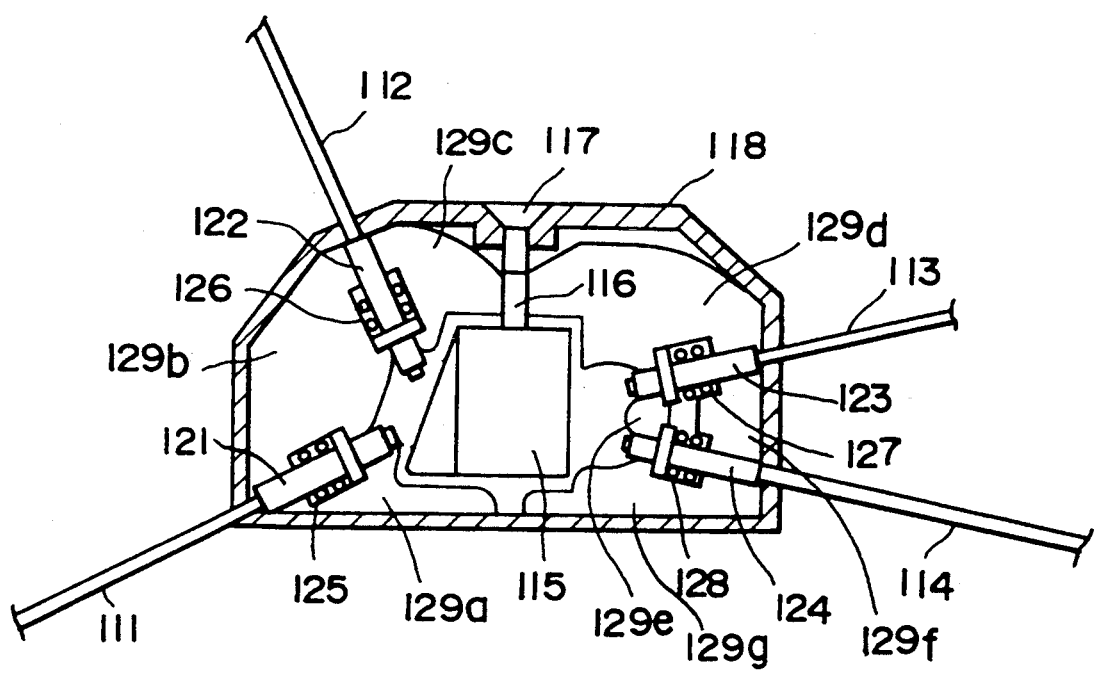
FIG. 20 is a sectional view of optical-path splitter coupler containing a composite polarization beam splitter according to an embodiment of the present invention.

FIG. 20 is a sectional view showing a general construction of an optical path splitter coupler into which the above composite polarization beam splitter is incorporated.

In FIG. 20, four optical fiber cables 111 to 114 are led to a single place and secured at one end each. In the central portion, the composite polarization beam splitter 115 is provided. At one end of each of optical fiber cables 111 to 114, the exposed optical fibers are connected to ferrules 121 to 124, respectively, in the case 118. The ferrules 121 to 124 are installed with springs 125 to 128 in tracks formed of irregular portions 129a, 129b, and 129b, 129c, and 129d, 129e, 129f, and 129g, 129e, 129f among uneven portions 129a to 129g within the case 118, respectively. The composite polarization beam splitter 115 is supported in place by the irregular portions 129a to 129g. The composite polarization beam splitter 115 is secured with a screw 117 via a bearing member 116 to prevent the deviation from the installation place.

In the optical splitter coupler with such an arrangement, light information input from the optical fiber cable 111 is divided by the composite polarization beam splitter 115 into three pieces of light information carrying polarization data and light intensity data, which are then supplied to the outside world via optical fiber cables 112, 113, and 114. By supplying light 10 information in the opposite direction, it is possible to combine a plurality of pieces of information into a single piece of information.

FIG. 11 is a schematic diagram of a system for measuring the thickness of the oxide film on a steel plate, where an ellipsometer of the embodiment is installed in the final stage of the continuous annealing line of steel plates in an iron mill.

A steel plate 31 delivered from the continuous annealing line at a constant speed is transported over roller 33a and 33b, and is rolled around a wind-up roll 34 to form a coil. Between rollers 33a and 33b, a plurality of measuring heads 35 (35a, 35b) are placed on the right side and the reverse side of the steel plate 31 across its width so that they may face each other.

The respective measuring heads 35 produce light intensities I1, I2, and I3, which are sent to the signal processing section 23 (not shown) and then to the computer (not shown), which processes them. One example of this processing has been explained in FIG. 5. In this way, the computer calculates the film thickness d of the oxide film on each of the right side and the reverse side of the steel plate 31.

In the range of film thickness d of 0.5 to 5 nm, $\cos\Delta$ and film thickness d determining the phase difference $\Delta$, among the ellipsoparameters determining the elliptically polarized light, have a proportional relationship between them, while $\phi$ remains almost constant. Thus, by previously measuring the relationship between $\cos\Delta$ and film thickness d by off-line measurement and then entering the proportional coefficients into the computer, it is possible to make calculation of film thickness d much faster.

In such a continuous annealing line, it has been considered that the oxide film thickness d has an effect on post-processing such as plating or formation, and the importance of measurement has been recognized. The thickness of oxide films ranges from 0.5 to 5 nm. To measure the thickness of this order accurately with an ellipsometer, it is necessary to accurately maintain the distance L between the measuring head and the steel plate 31 as the object to be measured, at a constant value. Actually, for example, the steel plate 31 is moving at a high speed, creating vibration due to motion. Thus, it is necessary to measure the film thickness d near rollers 33a and 33b. With the conventional system, however, the ellipsometer itself was so large that it could not be installed near rollers 33a and 33b. Particularly, when the film thickness d of the reverse side of the steep plate 31 was to be measured, since the coil on the wind-up roll existed on the side of rollers 33a and 33b, it was very difficult to secure space for installation of the conventional ellipsometer.

By using the measuring head 35 of the embodiment of the size of, for example, $100 \times 50 \times 25$ mm as shown in FIG. 2, it is possible to place this head 35 near roller 33a. As a result, the oxide film thickness d can be measured at a portion where almost no vibration of the steel plate 31 develops, thereby assuring sufficiently high measuring accuracy.

In the embodiment, five 25 mm-wide measuring heads 35 are arranged on each side of and across the 100 cm-wide steel plate 31. Use of such narrow measuring heads 35 makes it possible to measure the distribution of oxide film thickness across the steel plate 31 in an on-line state.

Conventionally, since on-line measurement was impossible, the worker cut off a portion of the steel plate 31, and took it to the laboratory for measurement of oxide film thickness. As compared with the conventional one, the apparatus of the embodiment can greatly improve the efficiency in checking products.

Figure 15:
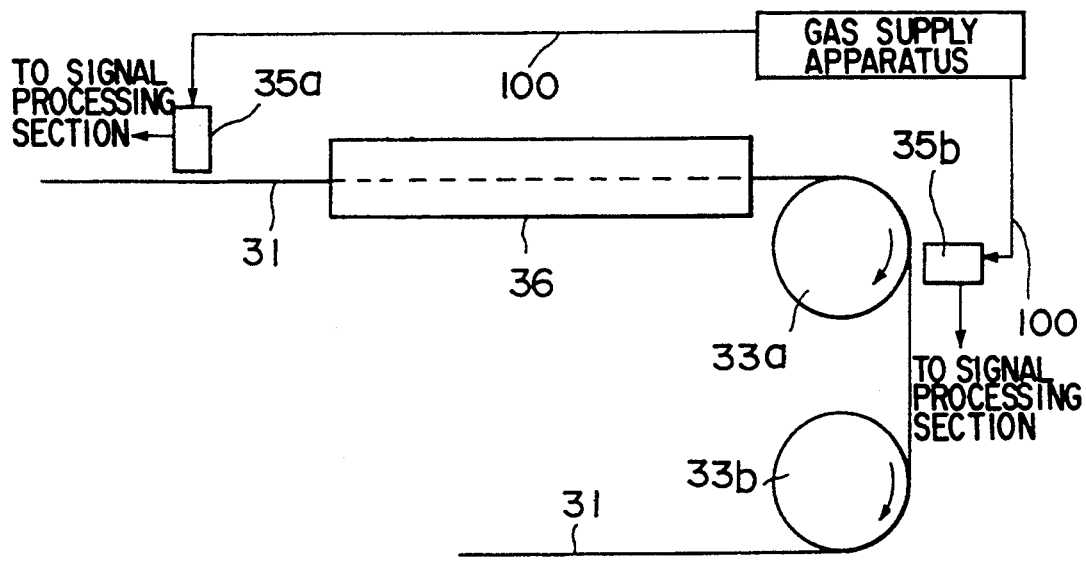
FIG. 15 is a schematic diagram of a coating thickness control apparatus employing a coating thickness control method according to an embodiment of the present invention.

FIG. 15 is a schematic diagram of a coating line in steel processing for applying oil to a steel plate in a formation mill. This coating line employs a coating thickness controller based on a coating thickness control method of the embodiment.

The steel plate 31 transported at a constant speed is coated with oil by a coating apparatus 36, and then is carried out by rollers 33a and 33b. A first and second measuring heads 35a and 35b are placed across the steel plate 31 so as to face the surface of the steel plate 31 in front of the coating apparatus 36 and between rollers 33a and 33b, respectively.

In both FIGS. 11 and 15, gas supply pipes are inserted in the respective measuring heads 35, and a gas having no effect on measurement, such as dry nitrogen, is supplied to measuring heads 35a and 35b. The gas is allowed to flow out from the holes, through which the incident light enters or the reflected light 17 leaves, at a rate of 500 to 5000 cc/min to cause gas pressure to prevent oil, dust, or the like from entering the optical system.

Figure 12:
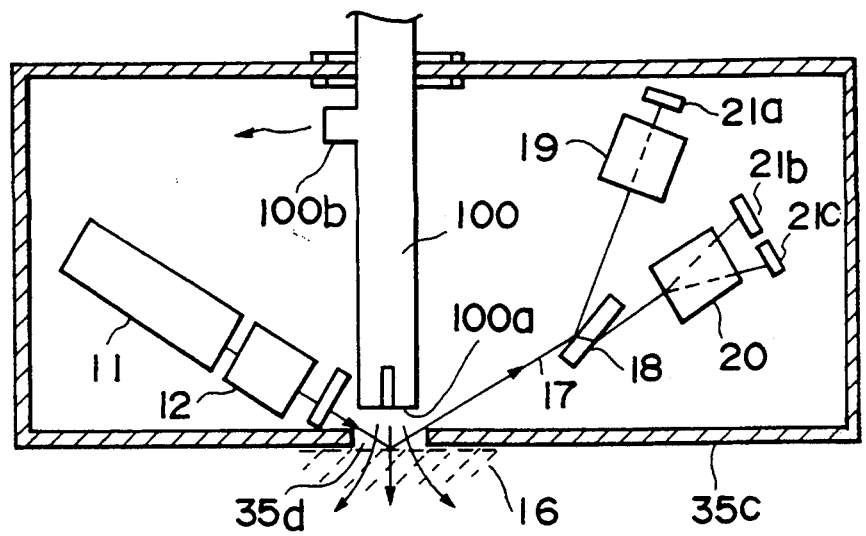
FIG. 12 is a schematic diagram of the measuring head in the coating thickness measuring apparatus.
Figure 13:
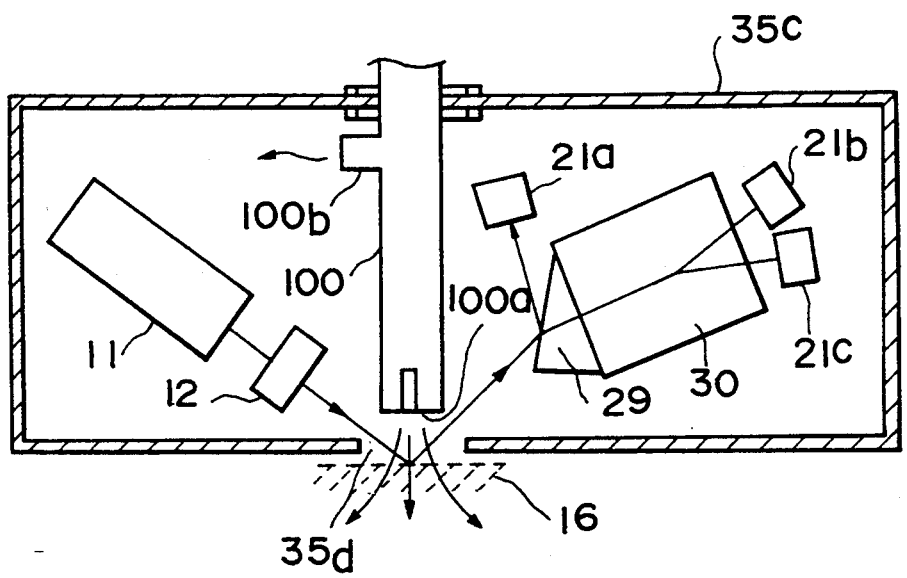
FIG. 13 is a schematic diagram of another measuring head in the coating thickness measuring apparatus.

Specifically, as shown in FIGS. 12 and 13, a gas supply tube 100 is inserted into a case 35c covering the optical system of the measuring head 35, so that the opening of the tube is located in the case. The case 35c has a hole 35d in it, through which the incident light 15 from the light source section 13 and the reflected light pass. The hole 35c also serves as a vent for the gas from the gas supply pipe 100. As shown in the figure, it is desirable that the nozzle of the gas supply pipe 100 should be positioned so as to blow gas against the hole 35d, but this is not the only way. Simply purging the case 35c of gas is acceptable as long as the hole 35d allows the pressurized gas to spout from the hole 35d to prevent foreign matters from entering the internal optical system. Another nozzle 100b in FIGS. 12 and 13 is provided especially to purge the case 35c of gas.

The respective measuring heads 35a and 35b produce light intensities I1, I2, and I3. The computer (not shown) calculates from the light intensities produced by the first measuring head 35a, ellipsoparameters $\Delta 1$ and $\psi 1$ at each point across the steel plate 31 before oil is applied by the coating apparatus 36. Similarly, it obtains ellipsoparameters $\Delta 2$ and $\psi 2$ after application of oil from the light intensities from the second measuring head 35b.

The difference $\Delta 12$ between phase differences $\Delta 1$ and $\Delta 2$ has been proved to be proportional to the film thickness d of oil applied:

$$\cos\Delta 12 = \cos(\Delta 2 - \Delta 1) \qquad (19)$$

If the time that a particular point on the steep plate 31 measured by the first measuring head 35a reaches the position of the second measuring head 35b is determined by the movement speed v of the steel plate 31, the amount of change in the ellipsoparameters of the elliptically polarized light at the same point can be measured. By supplying this amount of change to the coating apparatus 36 as a feedback amount, it is possible to automatically control the film thickness d of oil applied to a constant value. In this embodiment, a change in the film thickness d could be suppressed to ±3 nm. It will be understood that the film thickness d can be effectively controlled, since the coating apparatus 36 can control the coating thickness down to 2 nm.

Without the method of this embodiment, some steel plates 31 were difficult to extract the oil film thickness d only and measure it accurately, when the surface refractive index resembled that of the oil applied. It was also difficult to measure accurately when the surface state of the steel plate 31 changed continuously.

The coating thickness controller employing a coating thickness control method of the embodiment has not been put to practical use until the measuring head was made more compact without sacrificing high-speed measurement.

In this embodiment, the coating oil thickness d ranges from 2 to 30 nm. In this range of coating film thickness d, of the ellipsoparameters determining the elliptically polarized light, $\cos\Delta$ of the phase difference $\Delta$ is almost proportional to the film thickness d. Thus, by previously determining the relationship between $\cos\Delta$ and film thickness d by off-line measurement, and entering the proportional coefficients into the computer, it is possible to make calculation of film thickness d even faster.

The computer used in the embodiment is a commercially available 32-bit microcomputer. The distribution (5 points) for one line is obtained every 1 msec, and 1000 distributions are averaged before output. Since the movement speed V of the steel plate 31 is 5 m/sec, the measurement result is an average value for every 5 m. The measurement result is fed back to the coating apparatus 36 as described earlier so that the film thickness may be maintained at a set value.

Conventionally, since on-line measurement was impossible, a variation of up to ±13 nm occurred for a 100 m-long steel plate with a film thickness setting of 20 mn. Use of the embodiment could suppress the variation to ±8 nm. Accordingly, the efficiency in checking products can be improved substantially.

An example of the control block diagram of the on-line measuring system as shown in FIGS. 11 and 15 is illustrated in FIG. 14.

In the figure, like the measuring head 22 in FIG. 1, the measuring head is connected to the signal processing section and personal computer. A plurality of measuring heads 35 are divided into two groups placed on each side of the steel plate 31. The measuring heads 35a and 35b of each group are connected to each of personal computers 24a and 24b via corresponding signal processing sections 23a and 23b, respectively. In each group, the measurements at the respective measuring heads 35a and 35b are sent to the corresponding personal computers 24a and 24b through time-division communication. The measurement results may be stored temporarily in the memory of the personal computers 24a and 24b, or in an external memory.

The personal computers 24a and 24b are connected to a common bus line 101. Also connected to this common bus line 101 are an output display device 102, a memory device 102, a memory means 104 for storing manufacturing process information such as the movement speed of the steel plate 31 or manufacturing conditions for the object to be measured, a high-level computer 105, a man-machine interface 106 for the operator, a manufacturing process controller 107, and others.

For example, in the line of coating the steel plate 31 shown in FIG. 15, the respective personal computers 24a and 24b calculate ellipsoparameters $\Delta 1$ and $\Delta 2$ from the measurements by the measuring heads 35a and 35b at two places. The results are stored temporarily in the personal computers 24a and 24b. Then, based on the instruction from the high-level computer 105, the necessary data including ellipsoparameters $\Delta 1$ and $\Delta 2$ and other manufacturing process information are read. The high-level computer 105 calculates the film thickness d from those data.

The high-level computer 105 controls the system for film thickness measurement. It also have the function of automatically controlling the manufacturing processes, the object to be measured, to the optimum state or to the target state based on the measurement results. The man-machine interface 106 has the function of interfacing the high-level computer 105 to the low-level computers 24a and 24b. According to the operator or the program previously made, the necessary measurement data is displayed and stored as required.

Figure 16:
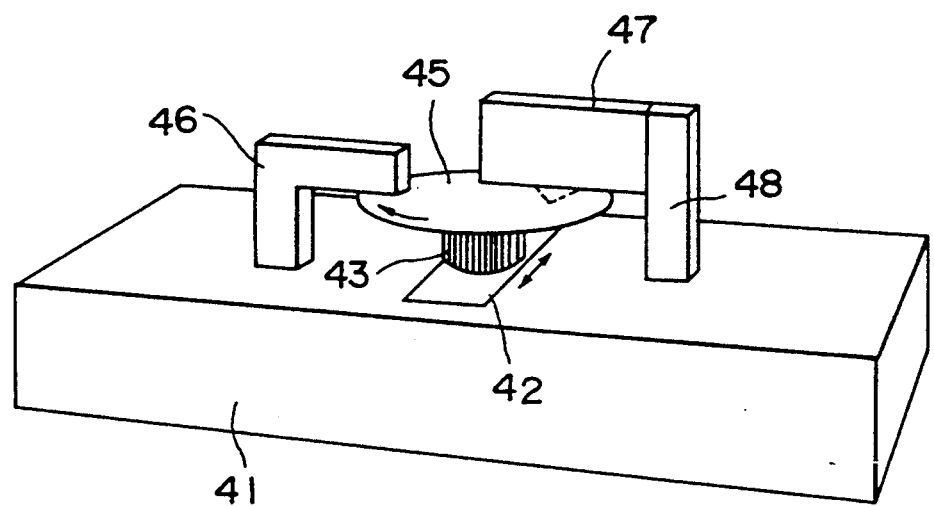
FIG. 16 is a schematic diagram of a film thickness distribution measuring apparatus employing the embodiments.

FIG. 16 illustrates a silicon wafer oxide film thickness distribution measuring apparatus to which an ellipsometer according to another embodiment of the present invention is applied.

A movable table 42 is provided on a base 41. Installed on the movable table 42 is a rotational supporting stock 43, on which a silicon wafer 35, the object to be measured, is mounted with an absorbing mechanism. The silicon wafer 45 moves linearly in the direction of arrow, while rotating. On the base 41, an existing thickness measuring apparatus 46, which measures the thickness of the entire wafer 45, is placed. In the opposite position of the thickness measuring apparatus 46, the measuring head 47 of the ellipsometer is fixed with a supporting member 48. The laser beam from the laser light source 11 in the measuring head 47 has a wavelength of 830 nm, an output of 1 mW, and a beam radius of 0.8 mm.

The thickness measuring apparatus 46 and measuring head 47 measure the entire thickness and oxide film thickness d of the silicon wafer 45 at each measuring position (R, $\theta$) moving under the control of the movable table 42 and rotational supporting stock 43.

FIG. 17 is a block diagram showing the electrical construction of the personal computer 24 incorporated into the oxide-film thickness-distribution measuring apparatus of FIG. 16. The electrical construction except for the moving mechanism 49, movable table 42, rotational supporting stock 43, and their control circuitry can be used as an electrical construction for an ellipsometer according to the present invention. Therefore, it is obvious that the remaining construction has the ability to process the respective light intensities I1, I2, and I3 in FIGS. 1, 9, and 10, and the respective light intensities I1, I2, and I3 from the measuring head 35 (35a, 35b) in FIGS. 11 and 15.

In FIG. 17, the respective analog light intensities I1, I2, and I3 from photodetectors 21a, 21b, and 21c in the measuring head 47 are amplified by amplifiers 50a, 50b, and 50c with a certain amplification factor, and then are sample-held for a certain period of time by sample-hold (S/H) circuits 51a, 51b, and 51c. Each sample-held light intensity is supplied to a multiplexer circuit 52. The multiplexer circuit 52 time-divides the three light intensities I1 to I3 into a single time-division multiple signal, and supplies it to an A/D converter 53. The A/D converter 53 converts the analog time-division multiple signal into a digital data signal, and supplies it to a bus line 54.

Connected to the bus line 54 is a CPU (central processing unit) 55 for performing various operation and control. Through the bus line 54, the CPU 55 controls a ROM 56 storing various control programs, a data memory 57 composed of a RAM storing various changing data including the light intensities I1 to I3 of the digital input, and an output device 58 supplying the computation results to the display unit or the printer.

The data memory 57 may be provided with magnetic tape means for storing necessary information. The necessary computation programs (for example, programs for executing equations (4) and (5), (4a) and (5a), (15) and (16), and (15a) and (16a) may be stored in the ROM 56 beforehand, or in the RAM in a rewritable manner.

A keyboard means (not shown) is also connected to the bus line 54 to assure man-machine interface. The measuring person can not only read the necessary information or program from the ROM 56 or RAM, but also rewrite the data or program in the RAM, using the keyboard means. He can also enter an instruction for the measuring unit or peripheral equipment, using the keyboard means. When incident light is set by inserting or removing a ¼ wavelength plate in or from the optical path of the incident light 15, it is necessary to choose more suitable calculation programs. In this case, he can choose calculation programs or corrects data or programs as required, using the keyboard means.

The CPU 55 controls sample holding timing with the respective sample-hold circuit 51a to 51d to control the operation of the multiplexer circuit 52. It also supplies a control signal to the moving mechanism 59, which drives the movable table 42 and rotational supporting stock 43, to control the moving position of the table 52 and stock 43.

Externally receiving a measuring instruction, the CPU 65 sends a control signal to the moving mechanism 59 to initialize the measuring position (R, θ) on the silicon wafer 45. Then, the respective light intensities I1 to I3 at the corresponding position are read via the A/D converter 53, and are stored temporarily in the data memory 57. Next, the read-out light intensities I1 to I3 are substituted into equations (4) and (5) for ellipsoparameters $\psi$ and $\Delta$. After ellipsoparameters $\psi$ and $\Delta$ are obtained, other suit able equations are used to compute the film thickness d and refractive index in the corresponding position (R, θ). When the film thickness d and refractive index have been measured in one measuring position, a control signal is sent to the moving mechanism 59 to change the measuring position (R, θ) to another for subsequent measurement. After measurement has been made for all measuring positions, the measuring of one silicon wafer 45 has finished.

The intermediate values or final values of the measurement results are displayed on a known display means such as a printer or CRT screen via the output device 58 controlled by the CPU 55.

The time required for the existing thickness measuring apparatus 46 to measure the thickness of a single silicon wafer 45 is approximately 20 seconds. In the same period of time, the ellipsometer can measure about 1000 points on the silicon wafer surface including calculations by the FIG. 17 microcomputer provided separately.

Therefore, installation of the measuring head 47 will not result in the movable table 42 put in deadlock or a decreased transport speed. Use of the ellipsometer can eliminate substandard silicon wafers 45 whose film thickness d exceeds the allowable range. As a result, substandard silicon wafers 44 cannot be carried out to the next process, thereby improving the entire productivity.

In the embodiment, the above-mentioned measuring heads 47 were attached to 20 wafer transporters, respectively, and measurement was made with a single personal computer 24. The time required for one measuring head to measure the film thickness d once was approximately 1 ms including the calculation time by the computer 24. On the other hand, the time required for the silicon wafer 45 to pass under the measuring head 47 was 1/20 second per head. Consequently, even if the 20 wafer transporters are all in operation simultaneously, measurements and calculations will be carried out in an acceptable period of time.

An ordinary wafer transporter did not have much extra space around it, so that it was very difficult to install a conventional ellipsometer. An additional process specializing in measuring the oxide film thickness d of a silicon wafer 45 enables measurement with the conventional apparatus. This configuration, however, increases not only the number of manufacturing processes of a silicon wafer 45, but also the probability that dust will adhere to the surface, creating a fear that the product yield will be reduced.

As described so far, because the ellipsometer of the embodiment has its measuring head 47 made much more compact and lightweight, it is not limited to the above-described application, but may be applied to on-line measurement of a nitride film, polysilicon film, transparent electrode material, oil film, and others by simply adding the ellipsometer to the existing equipment.

We claim:

1. An ellipsometer comprising:
   a light source section for projecting polarized light on an object to be measured at a specified angle;
   a composite polarization beam splitter for dividing reflected light from said object into a first polarized light component whose polarizing direction is set to a reference direction, and second and third polarized components having polarizing directions which are set to directions different from said reference direction;
   first, second and third photodetectors for sensing the light intensities of the first, second and third polarized light components divided by the composite polarization beam splitter; and
   a computing section for calculating ellipsoparameters of the elliptically polarized light of said reflected light, from the respective light intensities sensed by said first, second and third photodetectors;
   said composite polarization beam splitter comprising:
   an unpolarizing glass portion which has an incident angle at an incident surface thereof for the light reflected from said object set to a Brewster angle, and which divides light incident thereon at the incident surface into the reflected light component going to said first photodetector and the transmitted light going inside thereof; and a polarization beam splitter which is optically bonded to a light emitting surface of the unpolarizing glass portion from which the transmitted light leaves, and which divides the light passed through said unpolarizing glass member into the second and third polarized light components whose polarizing directions are different from said reference direction.

2. An ellipsometer according to claim 1, wherein:
said reference direction is set to a direction parallel to a plane of incidence of light on said object; and
the polarizing directions of said polarization beam splitter are set to directions having an angle of $+45°$ and $-45°$ relative to said reference direction.

3. An ellipsometer according to claim 1, wherein said at least said light source section, said respective beam splitters, and said photodetectors, are mounted on a single light-metal plate.

4. An ellipsometer according to claim 1, further comprising:
a case housing at least said light source section, said respective beam splitters, and said photodetectors, said case having a hole therein which is located at a position opposite to said object and through which the incident light reaches said object or leaves said object;
a gas supply pipe connected to said case so as to be inserted into said case; and
pressurized gas supply means for supplying a pressurized gas to said case via said gas supply pipe, and for exhausting the pressurized gas out of said case through said hole.

5. An ellipsometer comprising:
a light source section for projecting polarized light on an object to be measured at a specified angle;
a nonpolarization beam splitter for dividing reflected light from said object into reflected light and transmitted light;
an analyzer for extracting from the reflected light from said nonpolarization beam splitter a polarized light component having an angle of 0° relative to a reference direction parallel to a plane of incidence of light on said object;
a polarization beam splitter for dividing said transmitted light into two components in directions having an angle of $+45°$ and $-45°$ relative to said reference direction;
a plurality of photodetectors for sensing respective light intensities I1, I2 and I3 of the polarized light components in said directions having an angle of 0°, $+45°$ and $-45°$ from said analyzer and polarization beam splitter; and
a computing section for calculating ellipsoparameters made up of a phase difference $\Delta$ an amplitude ratio $\psi$ of elliptically polarized light of the reflected light from said object, using the following equations based on a light intensity sensed by each photodetector:

$$\cos(\Delta-\phi_i)=[(1+\sigma^2)(I2-I3)/4I1]\times[2I1/\{(1+\sigma^2)(I2+I3)-2I1\}]^{\frac{1}{2}}$$

$$\tan\psi=\tan p[2\sigma^2 I1/\{(1+\sigma^2)(I2+I3)-2I1\}]^{\frac{1}{2}}$$

where the phase difference $\phi_i$ and amplitude ratio p are ellipsoparameters of the incident light, and $\sigma$ is a constant which is determined by a Fresnel reflection coefficient of said nonpolarization beam splitter.

6. An ellipsometer comprising:
a light source section for projecting polarized light on an object to be measured at a specified angle;
an unpolarizing glass portion which receives reflected light from said object at an incident surface thereof at a Brewster angle, and which divides the light incident thereon into reflected light and transmitted light going inside the unpolarizing glass portion at its incident surface;
a polarization beam splitter which is optically bonded to a light emitting surface of said unpolarizing glass portion from which said transmitted light leaves, and which divides said transmitted light into two components in directions having an angle of $+45°$ and $-45°$ relative to a reference direction parallel to a plane of incidence of light on said object;
a plurality of photodetectors for sensing respective light intensities I1, I2 and I3 of reflected light from said unpolarizing glass portion and forming a polarized light component in a direction having an angle of 0° relative to said reference direction, and the light components having an angle of $+45°$ and $-45°$ from said polarization beam splitter; and
a computing section for calculating ellipsoparameters made up of a phase difference A and an amplitude ratio $\psi$ of elliptically polarized light of reflected light from said object, using the following equations based on the light intensity sensed by each photodetector:

$$\cos(\Delta-\phi_i)=[(1+\sigma^2)(I2-I3)/4I1]\times[2I1/\{(1+\sigma^2)(I2+I3)-2I1\}]^{\frac{1}{2}}$$

$$\tan\psi=\tan p[2\sigma^2 I1/\{(1+\sigma^2)(I2+I3)-2I1\}]^{\frac{1}{2}}$$

where the phase difference $\phi_i$ and amplitude ratio p are ellipsoparameters of the incident light, and $\sigma$ is a constant which is determined by a Fresnel reflection coefficient of said unpolarizing glass portion.

7. A composite polarization beam splitter comprising:
an unpolarizing glass portion having an incident angle at an incident surface thereof which is set to a Brewster angle, and which divides light incident thereon into reflected light and transmitted light going inside the unpolarizing glass portion at the incident surface thereto; and
a polarization beam splitter which is optically bonded to a light emitting surface of said unpolarizing glass portion from which said transmitted light leaves, and which divides said transmitted light into different polarized light components and supplies them to respective photodetectors.

8. A composite polarization beam splitter according to claim 7, wherein said unpolarizing glass portion and said polarization beam splitter portion are physically integrally formed.

* * * * *